United States Patent
Gao et al.

(10) Patent No.: US 11,490,294 B2
(45) Date of Patent: Nov. 1, 2022

(54) SWITCHING EVALUATION AND REPORTING METHOD, DEVICE, AND BASE STATION

(71) Applicant: ZTE CORPORATION, Shenzhen (CN)

(72) Inventors: Yuan Gao, Shenzhen (CN); Xiaojuan Shi, Shenzhen (CN); Jianmin Fang, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 77 days.

(21) Appl. No.: 17/254,790

(22) PCT Filed: Jun. 18, 2019

(86) PCT No.: PCT/CN2019/091725
§ 371 (c)(1),
(2) Date: Dec. 21, 2020

(87) PCT Pub. No.: WO2019/242608
PCT Pub. Date: Dec. 26, 2019

(65) Prior Publication Data
US 2021/0274399 A1    Sep. 2, 2021

(30) Foreign Application Priority Data
Jun. 22, 2018    (CN) .......................... 201810653869.4

(51) Int. Cl.
*H04W 4/00* (2018.01)
*H04W 36/00* (2009.01)
*H04W 56/00* (2009.01)

(52) U.S. Cl.
CPC ... *H04W 36/0058* (2018.08); *H04W 36/0094* (2013.01); *H04W 36/00837* (2018.08); *H04W 56/001* (2013.01)

(58) Field of Classification Search
None
See application file for complete search history.

(56) References Cited

U.S. PATENT DOCUMENTS

| 9,763,177 B1 | 9/2017 | Baskaran et al. |
| 2015/0172982 A1 | 6/2015 | Park et al. |

(Continued)

FOREIGN PATENT DOCUMENTS

| CN | 103391567 A | 11/2012 |
| CN | 103220740 A | 7/2013 |

(Continued)

OTHER PUBLICATIONS

3GPP. "LTE; Evolved Universal Terrestrial Radio Access E-UTRA and Evolved Universal Terrestrial Radio Access network E-UTRAN; Overall description; stage 2" TS 36.300 R14 14.6.0, Apr. 30, 2018 (Apr. 30, 2018), section 22.4.2.3.

(Continued)

*Primary Examiner* — Suhail Khan
(74) *Attorney, Agent, or Firm* — Morgan, Lewis & Bockius LLP

(57) ABSTRACT

Provided are a handover evaluation and report method, apparatus and a base station. A source base station sends a beam measurement indication, a cell measurement strategy and a threshold of one of RSRP, RSRQ, or SINR to a target base station. The target base station instructs the terminal to measure a cell on a source base station side according to the beam measurement indication and the cell measurement strategy. In response to determining that an inter-system handover of the terminal is an unnecessary handover accord- (Continued)

ing to a cell measurement result sent by the terminal, the target base station generates an inter-system handover report indicating that this handover of the terminal is the unnecessary handover and sends the inter-system handover report to the source base station Thus, the source base station acknowledges, according to the inter-system handover report, an unnecessary inter-system handover is performed by the terminal.

18 Claims, 7 Drawing Sheets

(56) References Cited

U.S. PATENT DOCUMENTS

| | | | |
|---|---|---|---|
| 2016/0353292 A1 | 12/2016 | Centonza et al. | |
| 2019/0342807 A1* | 11/2019 | Harada | H04W 24/08 |
| 2020/0092758 A1* | 3/2020 | Youn | H04W 92/02 |

FOREIGN PATENT DOCUMENTS

| | | |
|---|---|---|
| CN | 105101314 A | 11/2015 |
| CN | 105992255 A | 10/2016 |
| CN | 106465375 A | 2/2017 |
| CN | 107079318 A | 8/2017 |
| CN | 107820717 A | 3/2018 |
| CN | 107889145 A | 4/2018 |
| CN | 108141253 A | 6/2018 |

OTHER PUBLICATIONS

International Search Report for Application No. PCT/CN2019/091725, dated Sep. 6, 2019, 4 pages.
Chinese Office Action for Application No. 201810653869.4, dated Oct. 8, 2021, 16 pages including translation.
Chinese Office Action for Application No. 201810653869.4, dated Apr. 27, 2022, 11 pages including translation.
Chinese Supplemental Search Report for Application No. 201810653869.4, dated Apr. 20, 2022, 3 pages including translation.
Extended European Search Report for Application No. 19821602.0, dated Mar. 3, 2022, 13 pages.
Nokia et al., "Baseline CR for June version of RAN2 TS 38.300 (RAN3 part) covering agreements of RAN3#100", 3GPP Draft, 38300_CR0041_(REL-15)_R2-1809215_R3-183584, 3rd Generation Partnership Project (3GPP), Mobile Competence Centre, 650, Route Des Lucioles, F-06921 Sophia-Antipolis Cedex, France, vol. RAN WG2, No. Busan, Korea, May 21-May 25, 2018 Jun. 7, 2018 (Jun. 7, 2018), XP051511583, Retrieved from the Internet: URL:http://www.3gpp.org/ftp/ts%5Fran/TSG%5FRAN/TSGR%5F80/Docs/RP%2d181216%2Ezip [retrieved on Jun. 7, 2018].

* cited by examiner

SWITCHING EVALUATION AND REPORTING METHOD, DEVICE, AND BASE STATION

CROSS-REFERENCE TO RELATED APPLICATIONS

This is a National Stage Application filed under 35 U.S.C. 371 based on International Patent Application No. PCT/CN2019/091725, filed on Jun. 18, 2019, which claims priority to Chinese Patent Application No. 201810653869.4 filed on Jun. 22, 2018, the disclosures of both of which are incorporated herein by reference in their entireties.

TECHNICAL FIELD

The present disclosure relates to the communication field, for example, to a handover evaluation and report method, apparatus and a base station.

BACKGROUND

In a new radio, an inter-system handover of a terminal refers to a handover between a NR system and an Evolved UTRA (EUTRA) system. When the terminal performs the handover from the NR system to the EUTRA system, it is usually because the terminal detects that a current signal parameter of an NR system serving cell does not satisfy a parameter threshold set by an NG-RAN NodeB (gNB), so that the current signal parameter requires to fall back into the EUTRA system and services are provided by an Evolved Node B (eNB). However, if a threshold of the signal parameter for a serving cell set by the gNB is unreasonably, for example, the threshold of the parameter is set too high, which may lead to the inter-system handover of the terminal when a coverage of the gNB may satisfy a service requirement of the terminal. This inter-system handover is unreasonable and unnecessary, but at present, the gNB cannot determine whether the handover of the terminal is necessary.

SUMMARY

Embodiments of the present disclosure provide a handover evaluation and report method, apparatus and a base station, in which an inter-system handover detection and evaluation scheme is provided to solve the problem that the base station cannot determine whether a current inter-system handover of a terminal is necessary in the related art.

To solve the above-mentioned technical problem, a handover evaluation method is provided in an embodiment of the present disclosure and includes steps described below. Measurement configuration information and necessity evaluation information are sent to a target base station, where the measurement configuration information is used for the target base station to instruct a terminal to measure a cell on a source base station side and report a cell measurement result. An inter-system handover report that is generated by the target base station is acquired according to the cell measurement result and the necessity evaluation information, where the system handover report indicates that an inter-system handover of the terminal from a source base station to the target base station is an unnecessary handover.

In an embodiment, after the system handover report that is generated by the target base station is acquired according to the cell measurement result and the necessity evaluation information, the method further includes a step of: adjusting a handover threshold to trigger inter-system handover by the terminal according to the system handover report.

In an embodiment, sending the measurement configuration information and the necessity evaluation information to the target base station includes: sending the measurement configuration information and the necessity evaluation information to a source core network device for the source core network device to send the measurement configuration information and the necessity evaluation information to the target base station through a target core network device; and acquiring the inter-system handover report that is generated by the target base station according to the cell measurement result and the necessity evaluation information includes: receiving the inter-system handover report that is sent by the target base station through the target core network device and the source core network device in turn.

In an embodiment, sending the measurement configuration information and the necessity evaluation information to the source core network device includes a step of: in response to determining that the terminal needs to perform the inter-system handover from the base station to the target base station, sending the measurement configuration information and the necessity evaluation information to the source core network device, where the measurement configuration information and the necessity evaluation information are carried in a transparent container message from the source base station to the target base station.

In an embodiment, the measurement configuration information includes a beam measurement indication and a cell measurement strategy, where the beam measurement indication is used for instructing the terminal to measure a beam in the cell on the source base station side; and the cell measurement strategy is used for instructing the terminal to determine the cell measurement result according to a measurement result of the beam in the cell on the source base station side.

In an embodiment, the beam measurement indication includes at least one of: measurement duration, a measurement target bandwidth, a measurement frequency point list, or measurement configuration information of a synchronization signal/physical broadcast channel block (SSB) of the source base station side.

In an embodiment, the beam measurement indication further includes at least one of: an indication of whether to report information of a beam and a beam measurement result corresponding to the beam, or a maximum number of beams for which the beam measurement result is to be reported.

In an embodiment, the cell measurement strategy is used for instructing the terminal to select a preset number of beam measurement results according to a first threshold of a signal parameter, and to derive the cell measurement result according to the selected beam measurement results.

A handover report method is provided in an embodiment of the present disclosure and includes steps described below. Measurement configuration information and necessity evaluation information sent by a source base station are received. The measurement configuration information is sent to a terminal, where the measurement configuration information is used for instructing the terminal to measure a cell on a source base station side and to report a cell measurement result. Whether an inter-system handover of the terminal from the source base station to a target base station is necessary is determined according to the necessity evaluation information and the cell measurement result reported by the terminal. An inter-system handover report is generated in response to determining that the inter-system handover is an unnecessary handover, and the inter-system handover report is sent to the source base station.

In an embodiment, the inter-system handover report includes a handover type used for indicating that the inter-system handover of the terminal is the unnecessary handover. The inter-system handover report further includes at least one of: a handover type of the inter-system handover of the terminal, a serving cell identifier of the source base station side, a serving cell identifier of a target base station side, or a cell measurement result and corresponding cell identifier of the source base station side, where the cell measurement result satisfies each requirement of the necessity evaluation information.

In an embodiment, the inter-system handover report further includes information of a beam and a beam measurement result corresponding to the beam, which are reported by the terminal.

In an embodiment, receiving the measurement configuration information and the necessity evaluation information sent by the source base station includes: receiving the measurement configuration information and the necessity evaluation information sent by the source base station through a source core network device from a target core network device; and sending the inter-system handover report to the source base station includes: sending the system handover report to the source base station through the target core network device and the source core network device in turn.

In an embodiment, determining whether the inter-system handover of the terminal from the source base station to the base station is necessary according to the necessity evaluation information and the cell measurement result reported by the terminal includes: determining that the inter-system handover of the terminal is the unnecessary handover in response to determining that a measurement value of each signal parameter in at least one cell measurement result reported by the terminal satisfy a corresponding requirement in the necessity evaluation information; and determining that the inter-system handover of the terminal is a necessary handover in response to determining that a measurement value of at least one signal parameter in all the cell measurement results reported by the terminal does not satisfy a corresponding requirement in the necessity evaluation information.

In an embodiment, the measurement configuration information includes a beam measurement indication and a cell measurement strategy, where the beam measurement indication is used for instructing the terminal to measure a beam in the cell on the source base station side; and the cell measurement strategy is used for instructing the terminal to determine the cell measurement result according to a measurement result of a beam in the cell on the source base station side.

A handover detection method is further provided in an embodiment of the present disclosure and includes steps described below. Measurement configuration information from a source base station sent by a target base station is received; a cell on a source base station side is measured according to the measurement configuration information; and a cell measurement result is reported to the target base station, where the cell measurement result is used for generating, by the target base station with necessity evaluation information from the source base station taken into consideration, an inter-system handover report, where the inter-system handover report is sent to the source base station by the target base station, and the system handover report indicates that an inter-system handover of the terminal from the source base station to the target base station is an unnecessary handover.

In an embodiment, the measurement configuration information includes a beam measurement indication and a cell measurement strategy, and measuring the cell on the source base station side according to the measurement configuration information includes: measuring a beam in the cell on the source base station side according to the beam measurement indication; and determining a cell measurement result according to the cell measurement strategy and a measurement result of the beam in the cell.

In an embodiment, the beam measurement indication includes at least one of: a measurement duration, a measurement target bandwidth, a measurement frequency point list, or measurement configuration information of a synchronization signal/physical broadcast channel block (SSB) of the source base station side.

In an embodiment, the beam measurement indication further includes at least one of an indication of whether to report information of a beam and a beam measurement result corresponding to the beam, or the maximum number of beams for which the beam measurement result will be reported.

In an embodiment, determining the cell measurement result according to the cell measurement strategy and the measurement result of the beam in cell includes: selecting a preset number of beam measurement results according to a first signal parameter threshold carried in the cell measurement strategy, and deriving the cell measurement result according to the selected beam measurement results.

A handover evaluation apparatus is provided in an embodiment of the present disclosure and includes a configuration sending module and a report acquisition module. The configuration sending module is configured to send measurement configuration information and necessity evaluation information to a target base station, where the measurement configuration information is used for the target base station to instruct a terminal to measure a cell on a source base station side and to report a cell measurement result. The report acquisition module is configured to acquire an inter-system handover report that is generated by the target base station according to the cell measurement result and the necessity evaluation information, where the inter-system handover report indicates that an inter-system handover of the terminal from the source base station to the target base station is an unnecessary handover.

A handover report apparatus is provided in an embodiment of the present disclosure and includes a configuration receiving module, a measurement indication module, a necessity evaluation module and a handover report module. The configuration receiving module is configured to receive measurement configuration information and necessity evaluation information sent by a source base station; the measurement indication module is configured to send the measurement configuration information to a terminal, where the measurement configuration information is used for instructing the terminal to measure a cell on a source base station side and to report a cell measurement result; the necessity evaluation module is configured to determine whether an inter-system handover of the terminal from the source base station to a target base station is necessary according to the necessity evaluation information and the cell measurement result reported by the terminal; and the handover report module is configured to generate an inter-system handover report when the inter-system handover is determined as an unnecessary handover, and send the inter-system handover report to the source base station.

A handover detection apparatus is further provided in an embodiment of the present disclosure and includes a configuration acquisition module, a cell measurement module and a measurement report module. The configuration acquisition module is configured to receive measurement configuration information from a source base station sent by a target base station; a cell measurement module is configured to measure a cell on a source base station side according to the measurement configuration information; and a measurement report module is configured to report a cell measurement result to the target base station, where the cell measurement result is used for the target base station in combination with necessity evaluation information from the source base station to generate an inter-system handover report and send the inter-system handover report to the source base station, and the inter-system handover report indicates that an inter-system handover of the terminal from the source base station to the target base station is an unnecessary handover.

An embodiment of the present disclosure further provides a base station. The base station includes a first processor, a first memory and a first communication bus. The first communication bus is configured to implement a connection communication between the first processor and the first memory; and the first processor is configured to execute a handover evaluation program stored in the first memory to perform steps of the above-mentioned handover evaluation method; or execute a handover report program stored in the first memory to perform steps of the above-mentioned handover report method.

In an embodiment, in a case where the handover evaluation program is stored in the first memory, the base station is an NG-RAN base station; and in a case where the handover report program is stored in first the memory, the base station is an Evolved base station.

An embodiment of the present disclosure further provides a terminal. The terminal includes a second processor, a second memory and a second communication bus. The second communication bus is configured to implement a connection communication between the second processor and the second memory; and the second processor is configured to execute a handover detection program stored in the second memory to implement steps of the above-mentioned handover detection method.

An embodiment of the present disclosure further provides a storage medium. The storage medium stores at least one of: a handover evaluation program, a handover report program or a handover detection program. The handover evaluation program is executable by one or more processors to implement the steps of the handover evaluation method of any one of the preceding embodiments. The handover report program is executable by the one or more processors to implement the steps of the handover report method of any one of the preceding embodiments. The handover detection program is executable by the one or more processors to implement the steps of the handover detection method of any one of the preceding embodiments.

The beneficial effects of the present disclosure are described below.

According to the handover evaluation and report method, apparatus and the base station provided by the embodiments of the disclosure, the source base station sends the measurement configuration information and the necessity evaluation information to the target base station, the measurement configuration information is used for the target base station to instruct the terminal to measure the cell on the source base station side, and the cell measurement result of the cell is sent to the target base station. After receiving the cell measurement result sent by the terminal, the target base station determines whether the inter-system handover of the terminal from the source base station to the target base station is necessary according to the cell measurement result and the necessity evaluation information sent by the source base station. In response to determining that the inter-system handover of the terminal is an unnecessary handover, the target base station generates an inter-system handover report indicating that the handover of the terminal is the unnecessary handover and sends the inter-system handover report to the source base station. Thus, the source base station acknowledges, according to the system handover report, an unnecessary inter-system handover is performed by the terminal, and further acknowledges that the handover threshold of a signal parameter on this side may be unreasonable. Furthermore, the inter-system handover report sent by the target base station to the source base station can be served as the basis for the source base station to reflect and evaluate whether a handover threshold of the signal parameter set by the source base station side is reasonable, where the handover threshold of the signal parameter is capable of causing the terminal to carry out the inter-system handover. As compare with that the existing scheme in which the base station does not care about the necessity of the inter-system handover of the terminal, and does not acknowledge whether the handover threshold to trigger inter-system handover set by the source base station side is reasonable, the scheme according to the embodiments of the disclosure provides an approach to feed back the necessity of the inter-system handover of the terminal to the source base station, therefore, the source base station can determine, based on the feedback, the rationality of the handover threshold of the signal parameter set by the source base station, which is beneficial to improving the communication effect and communication experience on the terminal side.

Other features of the present application and corresponding beneficial effects are set forth later in the description, and it should be understood that at least part of the beneficial effects become apparent from the description of the present application.

DETAILED DESCRIPTION

To illustrate the objects, solutions and advantages of the present application clearer, the embodiments of the present disclosure will be described below in detail in conjunction with the embodiments and drawings. It is to be understood that the embodiments described herein are merely intended to explain the present application and not to limit the present application.

Embodiment One

Figure 1:
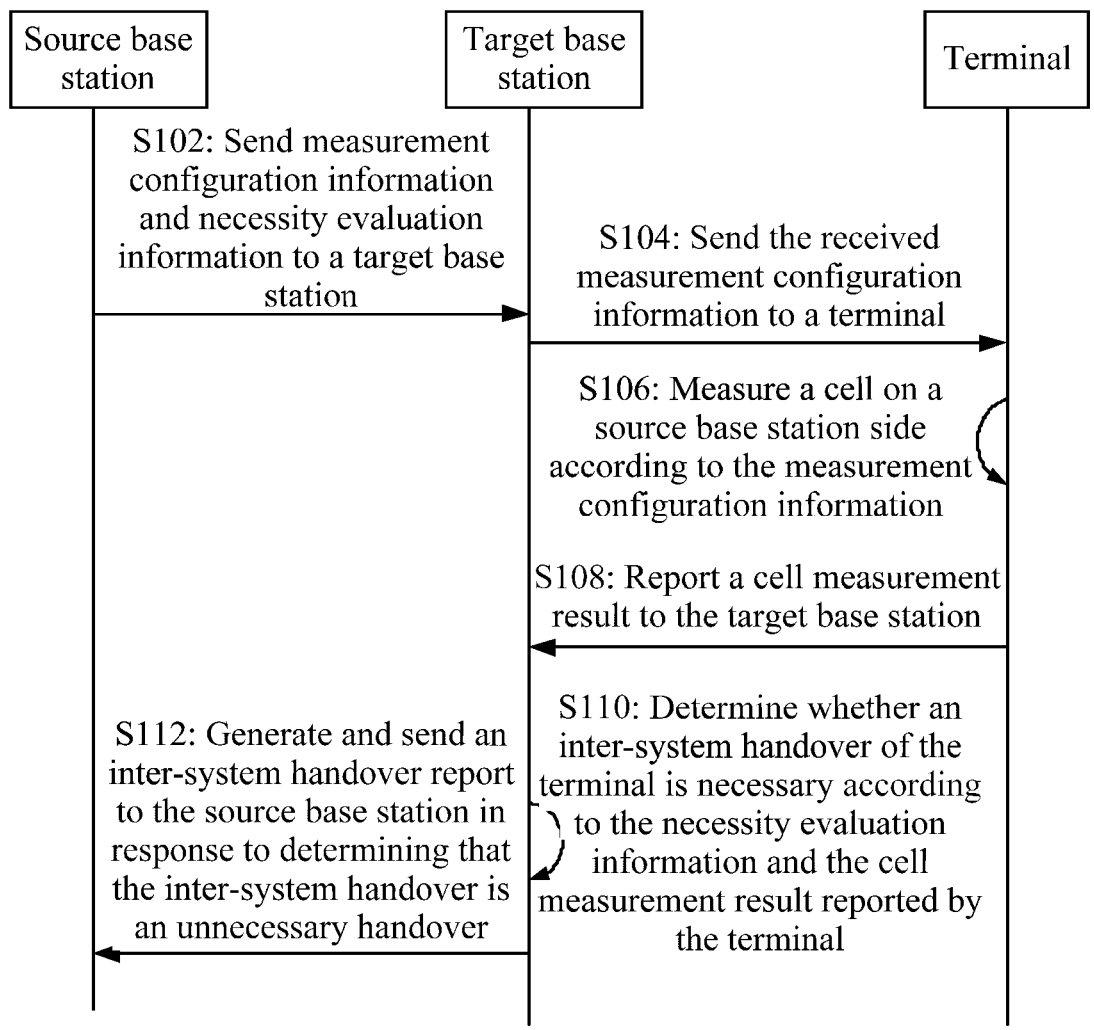
FIG. 1 is a flowchart of a handover evaluation scheme according to embodiment one of the present disclosure.

In order to solve the problem in the related art that a base station side does not care whether an inter-system handover of a terminal is necessary and cannot acknowledge the rationality of a signal parameter threshold to trigger inter-system handover set by the base station side, a handover evaluation scheme is provided in the present embodiment. The handover evaluation scheme may be implemented by a handover evaluation system including a source base station, a target base station, and a terminal. The scheme will be described below in connection with an interaction diagram of the source base station, the target base station, and the terminal in the handover evaluation scheme shown in FIG. 1.

In step S102, the source base station sends measurement configuration information and necessity evaluation information to the target base station.

The source base station refers to a base station that provides a service for the terminal before the terminal performs the inter-system handover, and the target base station is naturally a base station that provides the service for the terminal after the terminal completes the inter-system handover. The inter-system handover, as the name suggests, refers to the terminal switching from a base station of a communication system to a base station of the other communication system. Certainly, the inter-system handover may be switched from a base station using a relatively old communication technology (hereinafter referred to as "old base station") to a base station using a relatively new communication technology (hereinafter referred to as "new base station"), for example, from an eNB base station in a 4G communication system to a gNB base station in a 5G communication system; or may be switched from the new base station to the old base station. For example, the terminal switches from the gNB base station to the eNB base station or a base station in a 2G or 3G communication system. It is understood that if a current coverage situation of the new base station satisfies a service requirement of the terminal, the terminal should be allowed to reside under the new base station as far as possible, and the new base station should provide a communication service for the terminal, which is beneficial to improving the communication experience of the terminal side users. In the present embodiment, a scenario that the source base station needs to understand the necessity of the inter-system handover of the terminal refers to the handover of the terminal from the new base station to the old base station. For the inter-system handover of the terminal from the old base station to the new base station, the source base station may not have to care about the necessity of the inter-system handover of the terminal, because it is beneficial to improve the experience of the terminal side users.

The measurement configuration information is used for instructing the terminal to measure a cell on a source base station side and report a cell measurement result. The measurement configuration information includes at least information for instructing a measurement target to the terminal and how the terminal measures measurement strategy information. After the target base station acquires the measurement configuration information, the terminal may be instructed to measure the cell on the source base station side according to an indication in the measurement configuration information.

The necessity evaluation information is used for the target base station to determine the cell measurement result reported by the terminal, so as to determine whether the terminal to perform the inter-system handover from the source base station to the target base station is necessary. It is understood that the necessity evaluation information may include indexes of at least one signal parameter that determine whether the inter-system handover of the terminal is necessary, for example, these indexes may be a second threshold of the signal parameter. The signal parameter may include, but is not limited to, at least one of reference signal received power (RSRP), reference signal received quality (RSRQ), or signal to interference plus noise ratio (SINR). For example, when the signal parameter includes the RSRP and the SINR at the same time, the necessity evaluation information may include a second threshold of the RSRP and a second threshold of the SINR at the same time.

In the present embodiment, a communication mode between the source base station and the target base station is not specifically limited, and any mode or approach in which the source base station may send the measurement configuration information and the necessity evaluation information to the target base station is feasible, for example, the communication between the source base station and the target base station may be directly communicated, or the communication may be performed through other devices.

It is understood that a handover evaluation system may include not only the aforementioned source base station, target base station and terminal, and further includes other network devices. For example, in one example of the present embodiment, the handover evaluation system further includes a source core network device and a target core network device, where the source core network device is a core network device in a communication system of the source base station side, and the target core network device is a core network device in a communication system of the target base station side. For example, if the source base station is the gNB and the target base station is the eNB, the source core network may be a 5G core network and the target core network may be a 4G core network.

Figure 2:
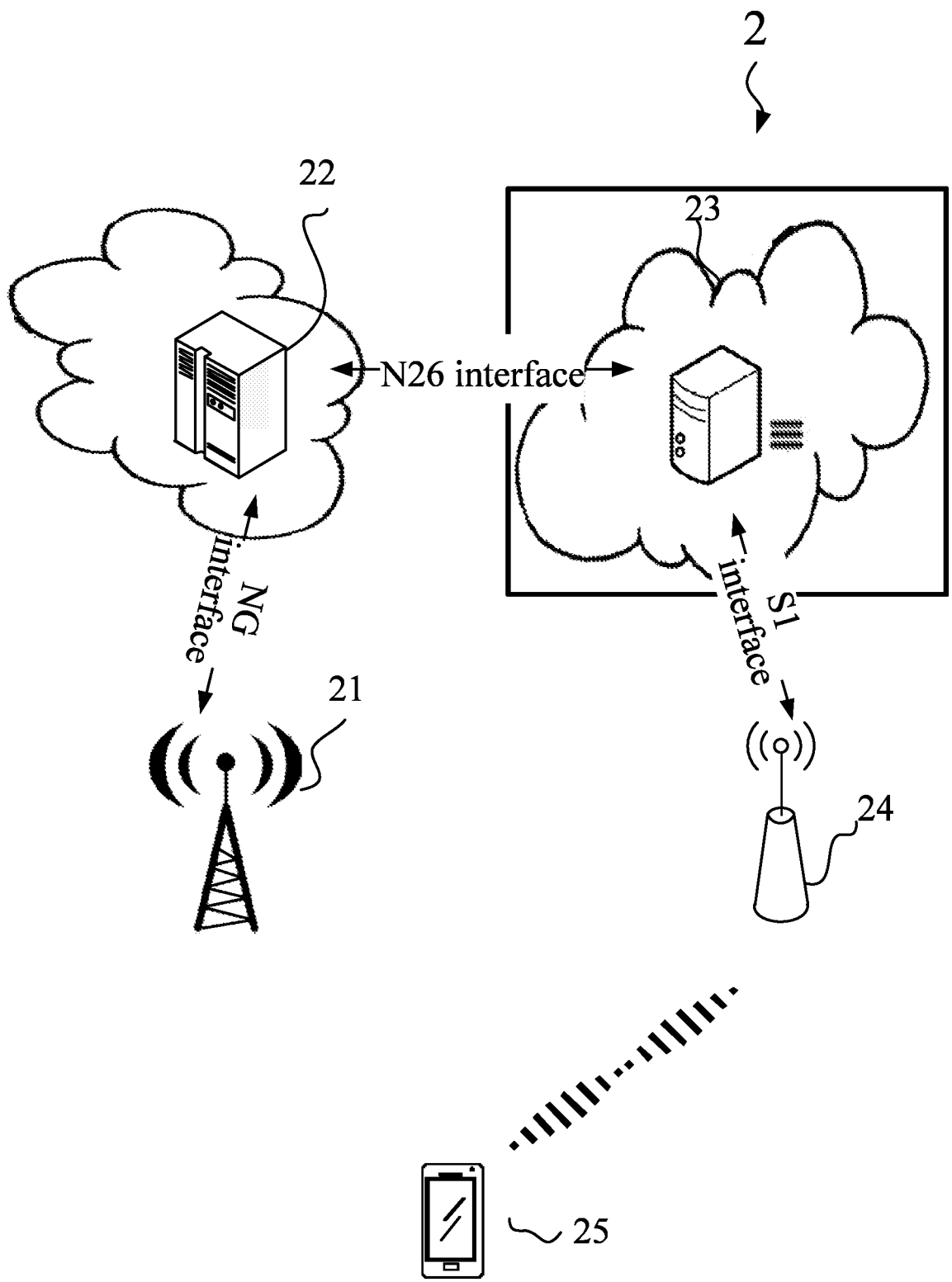
FIG. 2 is a structural diagram of a handover evaluation system according to embodiment one of the present disclosure.

In some examples of the present embodiment, as shown in FIG. 2, FIG. 2 shows a schematic diagram of a handover evaluation system 2. The handover evaluation system 2 includes a source base station 21, a target base station 24, a terminal 25, a source core network device and a target core network device, where the source base station 21 is the gNB and the target base station 24 is the eNB, correspondingly, the source core network device is an access mobility function (AMF) network element 22, and the target core network device is a mobility management entity (MME) network element 23. The source base station 21 may communicate with the AMF network element 22 through an NG interface, the target base station 24 may communicate with the MME network element 23 through an S1 interface, and the AMF network element 22 may interact with the MME network element 23 through an N26 interface. In this example, the source base station 21 may first send the measurement configuration information and the necessity evaluation information to the AMF network element 22 through the NG interface, then the AMF network element 22 sends the measurement configuration information and the necessity evaluation information to the MME network element 23 through the N26 interface, and then the MME network element 23 may send the measurement configuration information and the necessity evaluation information to the target base station 24 through the S1 interface.

In step S104, the target base station sends the received measurement configuration information to the terminal.

After the target base station receives the measurement configuration information and the necessity evaluation information sent by the source base station, the terminal may be instructed to measure the cell on the source base station side according to the measurement configuration information. For example, in the present embodiment, the target base station may send the received measurement configuration information to the terminal.

In some examples of the present embodiment, when the terminal needs to perform the inter-system handover from the base station to the target base station, the source base station sends the measurement configuration information and the necessity evaluation information carried in a transparent container message from the source base station to the target base station to the target base station, therefore, after the target base station acquires the measurement configuration information and the necessity evaluation information through the transparent container message from the source base station to the target base station, it is necessary to give feedback to the source base station side, and the source base station instructs the terminal that is about to perform the inter-system handover but has not yet completed the handover to switch to the target base station.

In step S106, the terminal measures the cell on the source base station side according to the measurement configuration information.

After the measurement configuration information is acquired from the target base station, the terminal may measure the cell on the source base station side according to the measurement configuration information and feed back a measurement result to the target base station based on the cell, that is, sends the cell measurement result to the target base station.

In some examples of the present embodiment, since the source base station is the gNB, the measurement of the cell on the source base station side performed by the terminal is actually based on the measurement of the beam in the cell. In the measurement configuration information, the source base station is configured with a beam measurement indication and a cell measurement strategy, and the beam measurement indication enables the terminal to measure each beam in the cell on the source base station side in units of beams. It is understood that the source base station includes at least one cell, and the source base station configures at least one beam for each cell. The terminal may acquire a measurement result of each beam in the cell according to the beam measurement indication, and in order to acquire the cell measurement result, the terminal may determine the measurement result of the cell based on the measurement result of each beam according to the cell measurement strategy in the measurement configuration information.

Assuming that the target base station is the eNB, considering that the measurement of the NR system performed by the terminal in the Long Term Evolution (LTE) system only supports the measurement of SS/PBCH block (SSB), therefore, in some examples of the present embodiment, a physical layer acquires the measurement results of a plurality of beams in the cell by measuring the SSB. In this example, the beam measurement indication may include measurement configuration information of the SSB of the source base station side. In addition to the measurement configuration information of the SSB of the source base station side, the beam measurement indication further includes a measurement duration configured by the source base station, a measurement target bandwidth configured by the source base station, and a measurement frequency point list configured by the source base station. The measurement duration is used for instructing the terminal to measure the cell on the source base station side in which time period. The measurement target bandwidth and the measurement frequency point list are mainly used for the terminal to determine a measurement target.

In some examples of the present embodiment, the cell measurement strategy may instruct the terminal to derive the measurement result of the cell based on the measurement result of each beam in the cell. In more examples, the cell measurement strategy only may instruct the terminal to select some of the beam measurement result to derive the cell measurement result. The cell measurement strategy will instruct how the terminal selects and how many beam measurement results are selected. In this scheme, the terminal calculates the cell measurement result based on the beam measurement results which have been selected based on the cell measurement strategy, for example, the terminal calculates the average value of the selected beam measurement results to acquire the cell measurement result.

In step S108, the terminal reports the cell measurement result to the target base station.

After the cell measurement result of each cell in the source base station is acquired, the terminal sends the cell measurement result to the target base station, so that the target base station determines whether the handover of the terminal from the source base station to the target base station is necessary.

In step S110, the target base station determines whether the inter-system handover of the terminal from the source base station to the target base station is necessary according to the necessity evaluation information and the cell measurement result reported by the terminal.

According to the previous introduction, the necessity evaluation information may be used for the target base station to evaluate the cell measurement result fed back by the terminal. The necessity evaluation information includes a second threshold of a signal parameter, and the target base station may determine whether a measurement value of the signal parameter of a corresponding side in the cell measurement result exceeds the second threshold of the signal parameter. Assuming that the necessity evaluation information includes a second threshold of the signal parameter A and a second threshold of the signal parameter B, the target base station needs to evaluate whether the measurement value of the signal parameter A in the cell measurement result exceeds the second threshold of the signal parameter A, and whether the measurement value of the signal parameter B in the cell measurement result exceeds the second threshold of the signal parameter B in the necessity evaluation information.

It is understood that since the necessity evaluation information is from the source base station side, the second threshold of the signal parameter is set by the source base station. When the second threshold of the signal parameter is set, the source base station needs to consider the lowest level of the signal parameter that may provide services to the terminal. For example, assuming that the signal parameter is the RSRP, when the source base station needs to consider the lowest required RSRP level for the source base station to provide services to the terminal and set the second threshold to a value higher than or equal to it. Otherwise, when a measurement value of the RSRP of the cell is higher than the second threshold of the RSRP in the cell measurement result reported by the terminal, the target base station still cannot determine whether the RSRP of the current cell satisfies a requirement for providing the services. In the present embodiment, the second threshold of one signal parameter is usually slightly higher than the lowest value of the signal parameter when providing the services to the terminal.

For each cell, if the measurement value of each signal parameter in the cell measurement result satisfies a corresponding requirement in the measurement evaluation information, it means that the cell can actually provide a signal coverage satisfying the service requirement of the terminal to the terminal at least during the time period when the terminal performs measurement. In some examples of the present embodiment, if the target base station determines that measurement results of at least N cells among the M cell measurement results reported by the terminal all indicate that the service requirement of the terminal may be satisfied, the target base station determines that the inter-system handover of the terminal from the source base station to the base station side is unnecessary and belongs to the unnecessary handover. If the number of cell measurement results that satisfy each requirement of the necessity evaluation information among M cell measurement results is less than N, the target base station may determine that the inter-system handover of the terminal from the source base station to the target base station side belongs to the necessary handover. N is less than or equal to M. In one example of the present embodiment, N is equal to 1. As long as the target base station determines that the measurement value of each signal parameter in at least one cell measurement result in each cell measurement result reported by the terminal satisfies the corresponding requirement in the necessity evaluation information, the target base station determines that the inter-system handover of the terminal belongs to the unnecessary handover, because if the terminal continues to reside on the source base station side, a cell corresponding to the cell measurement result at least can satisfy the service requirement of the terminal. If the target base station determines that more or less measurement values of some signal parameters in each cell measurement result reported by the terminal do not satisfy the corresponding the requirement in the necessity evaluation information, the target base station determines that the inter-system handover of the terminal belongs to the necessary handover, because during this measurement duration of the terminal, no cell on the source base station side can satisfy the service requirement of the terminal, therefore, if the terminal continues to reside under the source base station, the source base station cannot provide the requirement satisfactory to the user to the terminal.

In step S112, an inter-system handover report is generated when the target base station determines that the inter-system handover is the unnecessary handover, and sent to the source base station.

After the target base station determines the necessity of the inter-system handover of the terminal according to the necessity evaluation information and the cell measurement result reported by the terminal, if it is determined that the inter-system handover of the terminal is the unnecessary handover, an inter-system handover report is generated and sent to the source base station, so that the source base station knows that the unnecessary inter-system handover currently has occurred at the terminal according to the inter-system handover report, and then whether a handover threshold of the signal parameter set by the source base station is appropriate can be evaluated based on the received inter-system handover report. It is understood that since the inter-system handover report is generated and sent to the source base station when the target base station determines that the unnecessary handover has occurred at the terminal, the inter-system handover report should include information capable of instructing that the handover of the terminal is an unnecessary handover.

In some examples of the present embodiment, no matter whether the handover of the terminal is necessary, the target base station may generate the inter-system handover report and send the system handover report to the source base station. However, it is understood that handover reports generated for two situations of the unnecessary handover and the necessary handover occurred at the terminal are different, at least the inter-system handover generated by the target base station when the necessary inter-system handover has occurred at the terminal cannot indicate that the inter-system handover of the terminal is unnecessary. In one example of the present embodiment, the inter-system handover report generated by the target base station may indicate the necessity of the inter-system handover of the terminal through a "handover issue". If the inter-system handover of the terminal from the source base station to the target base station is the unnecessary handover, information carried in the handover issue may be information that may indicate the handover as an "unnecessary inter-system handover", otherwise, the information carried in the handover issue may be other information. For example, assuming that the information carried in the handover issue may be "0", "1", and "2", where "0" indicates that the handover issue is the unnecessary system handover, "1" indicates that the handover of the terminal is due to a first issue, and "2" indicates that the handover of the terminal is due to a second issue, then after the target base station determines that the inter-system handover of the terminal is the unnecessary handover, a value carried in the handover issue in the generated inter-system handover report should be "0".

In other examples of the present embodiment, the inter-system handover report includes, in addition to information indicating the necessity of the inter-system handover of the terminal, such as the handover issue, and may further include at least one of the following.

1) A handover type of the inter-system handover of the terminal.

2) A serving cell identifier of the source base station side, where a serving cell on the source base station side is a cell that resides on the source base station side before the terminal leaves the source base station and switches to the target base station side.

3) A serving cell identifier of the target base station side, where the serving cell of the target base station side refers to a cell that the target base station side provides the services for the terminal after the terminal achieves the inter-system handover.

4) A cell measurement result and corresponding cell identification of the source base station side, where cell measurement result satisfies each requirement of the necessity evaluation information. If the target base station determines that the measurement value of each signal parameter in the cell measurement results of K cells on the source base station side is greater than the second threshold of the corresponding signal parameter in the necessity evaluation information, the target base station can send the cell identifications of the K cells and the cell measurement results of the K cells carried in the inter-system handover report to the source base station.

5) Beam information and a beam measurement result corresponding to the beam information. If the measurement configuration information configured by the source base station includes "an indication of whether to report information of a beam and a beam measurement result corresponding to the beam", and the indication instructs that the terminal needs to report the information of the beam and a beam measurement result corresponding to the beam, the inter-system handover report further includes the information of the beam reported by the terminal and the corresponding beam measurement result. If the measurement configuration information further instructs the maximum number of pieces of beam information to be reported and beams for which the beam measurement results should be reported, the number of pieces of beam information and beams for which the beam measurement results should be reported carried in the inter-system handover report should be smaller than or equal to the requirement of the maximum number.

According to the foregoing introduction, in some handover evaluation systems, the target base station may communicate with the source base station through the target core network device and the source core network device, so in one example of the present embodiment, the target base station may send the inter-system handover report to the target core network device, and then the target core network device may send the inter-system handover report to the source base station through the source core network device. With reference to the handover evaluation system 2 shown in FIG. 2, the target base station 24 may first send the inter-system handover report to the MME network element 23 through the S1 interface, and then the MME network element 23 sends the inter-system handover report to the AMF network element 22 through the N26 interface. After receiving the inter-system handover report from the target base station 24, the AMF network element 22 will send the inter-system handover report to the source base station 21 through the NG interface. It is understood that the communication mode between the target base station and the source base station is not limited to the one introduced in this example.

In the present embodiment, after the source base station receives the inter-system handover report sent by the target base station, it is determined that the necessity of the terminal to hand over to the target base station. Further, when the source base station determines that the inter-system handover report indicates that the handover of the terminal is the unnecessary handover, it may be determined that a handover threshold to trigger inter-system handover of the source base station side may be set unreasonably. Certainly, if an inter-system handover of only one terminal is the unnecessary handover, the unnecessary handover may be caused due to accidental factors, however, if the source base station receives multiple inter-system handover reports, and the multiple system handover reports indicate that the handover of the corresponding terminal is the unnecessary handover, so in this case, the source base station can determine that the handover threshold of the signal parameter is set to a unreasonable value, therefore, the handover threshold of the signal parameter can be adjusted according to the inter-system handover reports.

A handover evaluation scheme is provided in the embodiment and includes a handover evaluation method implemented by the source base station side, a handover report method implemented by the target base station side, and a handover detection method implemented by the terminal side. Through the mutual interaction and cooperation of the source base station, the target base station and the terminal, after the terminal switches from the source base station to the target base station, the source base station can know whether this inter-system handover of the terminal is the necessary handover, and then reflect on whether the handover threshold of the signal parameter on the source base station side that can cause the terminal to carry out the inter-system handover is set reasonably. In order to avoid the problem in the related art that the source base station does not know that the terminal always performs the unnecessary handover due to unreasonable setting the handover threshold of the signal parameter on the source base station side, therefore, the handover evaluation scheme in the embodiment is actually a feedback mode for the source base station. When the handover threshold of the signal parameter is set/adjusted, the source base station may consider the feedback of the handover threshold of the current signal parameter on the terminal side, thus setting a more reasonable handover threshold, reducing the unnecessary handover on the terminal side and improving the user experience on the terminal side.

Embodiment Two

Figure 3:
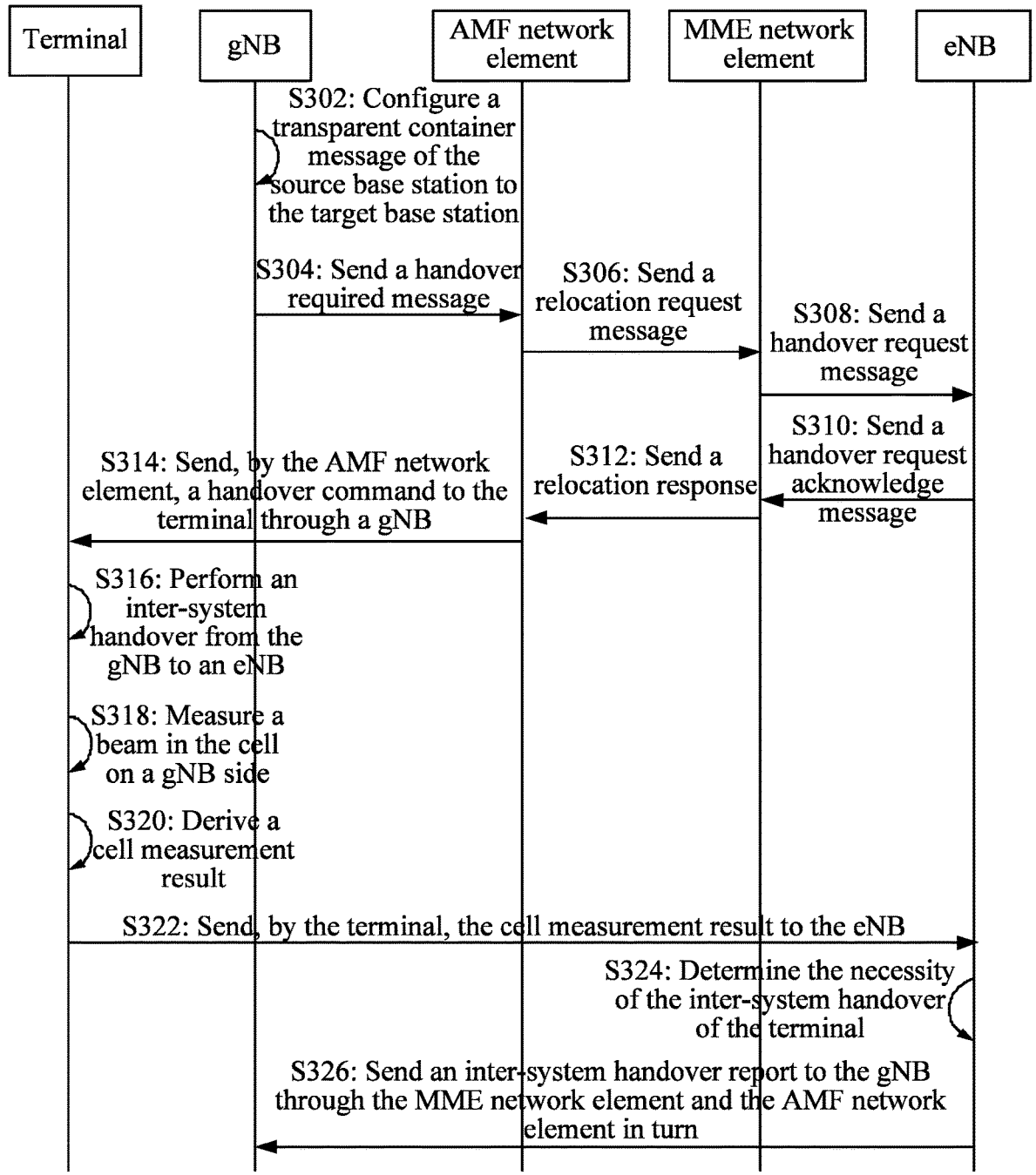
FIG. 3 is an interactive diagram of each device in a handover evaluation system according to embodiment two of the present disclosure.

The present embodiment will continue to introduce the handover evaluation scheme in the foregoing embodiment in conjunction with the handover evaluation system shown in FIG. 2 on the basis of the embodiment one. It is understood that the scheme provided in the present embodiment may be applied not only to a scenario where the terminal switches from a 5G base station to a 4G base station, but also to handover scenarios of the base stations of other different systems, such as a handover from the 5G base station to a 3G base station, or a handover from the 4G base station to a 3G/2G base station, or even handover from the base station in a future communication system to the base station in the existing communication system. Please refer to a flowchart of a handover evaluation shown in FIG. 3.

In step S302, a gNB configures measurement configuration information and necessity evaluation information in a source eNB to target eNB transparent container message.

In the present embodiment, the gNB may configure new IE IRAT measurement configuration information in a source eNB to target eNB transparent container message, and the IRAT measurement configuration information may include measurement configuration information indicating the terminal to measure a cell of a gNB side and necessity evaluation information used for the target base station eNB to determine the necessity of the terminal to switch from the gNB to the eNB. An example of the IRAT measurement configuration is presented, and the IRAT measurement configuration may include the following information.

The information includes: 1) a period t1-t2 for measuring a source base station side; 2) a frequency point list for measuring the source base station side; 3) a measurement bandwidth of a carrier of the source base station side; 4) measurement configuration information of a SSB of the source base station side; 5) a first threshold of a signal parameter; 6) the maximum number of selected beams when the terminal determines a cell measurement result; 7) a second threshold of the signal parameter.

Information 1) to 6) are information used for instructing the terminal to measure the cell on the gNB side to acquire the cell measurement result, so that the information belongs to the measurement configuration information. Information 7) is use for the target base station eNB to determine whether an inter-system handover of the terminal is necessary, thus belonging to the necessity evaluation information. For the measurement configuration information in the IRAT measurement configuration, i.e. information 1) to 6), where information 1) to 4) are information used for instructing the terminal to measure a beam in the cell on the source base station gNB side to acquire a beam measurement result, so that in the present embodiment, the information is referred to as a beam measurement indication. Information 5) and 6) may instruct the terminal to select a part from each beam measurement result of the cell to participate in calculating the measurement result of the cell, so that in the present embodiment, information 5) and 6) are information used for instructing the terminal to determine the cell measurement result according to the measurement result of the beam in the cell, and therefore, the information is referred to as a "a cell measurement strategy".

The IRAT measurement configuration includes, in addition to the above-mentioned information 1)-7), and may further include the following content.

8) An indication of whether to report a beam; and 9) the maximum number of to-be-reported beams.

The content in 8) is used for instructing to the terminal whether the beam needs to be reported, i.e. instructing whether the terminal needs to report the information of the beam and a beam measurement result corresponding to the beam. The content in 9) is to instruct the terminal to report the number of beams when it is determined that the terminal needs to report the information of the beam and the beam measurement result corresponding to the beam.

In step S304, the gNB sends the source eNB to target eNB transparent container message carried in a handover required message to an AMF network element.

In the present embodiment, after the IRAT measurement configuration is configured in the source eNB to target eNB transparent container message, the gNB sends the source eNB to target eNB transparent container message carried in the handover required message to the AMF network element. The handover required message, that is, a handover required. Since the gNB may communicate with the AMF network element through an NG interface, the gNB can send the handover required to the AMF network element through the NG interface.

In step S306, the AMF network element sends the source eNB to target eNB transparent container message carried in a relocation request to an MME network element.

After receiving the handover required message sent by the gNB, the AMF network element may extract the source eNB to target eNB transparent container message in the handover required message, generate the relocation request according to the extracted source eNB to target eNB transparent container message, and then send the relocation request to the MME network element through the N26 interface.

In step S308, the MME network element sends the source eNB to target eNB transparent container message carried in a handover request message to an eNB.

After receiving the relocation request sent by the AMF network element through the N26 interface, the MME network element may generate the handover request message according to the source eNB to target eNB transparent container message in the relocation request message and then send the handover request message to the eNB through the S1 interface.

In step S310, the eNB sends a handover request acknowledge to the MME network element.

After the handover request message is received, the eNB sends a handover request acknowledge message to the MME network element according to the handover request message. The eNB still sends the handover request acknowledge message to the MME network element through the S1 interface.

In step S312, the MME network element sends a relocation response to the AMF network element.

After the handover request acknowledge message sent by the target eNB is received, the MME network element may send a relocation response message to the AMF network element through the N26 interface according to the handover request acknowledge message as a response for the AMF network element sending the relocation request message to the MME network.

In step S314, the AMF network element sends a handover command to the terminal through the gNB.

After the relocation response message from the MME network element is received, the AMF network element may send the handover command to the terminal through the gNB according to the relocation response message, and instructs the terminal to switch from the source gNB to the target eNB according to the handover command.

In step S316, the terminal switches from the gNB to the eNB according to the handover command.

After the handover command message sent by the gNB is received, the terminal switches to the eNB according to the handover command message. It is understood that in some examples of the present embodiment, after the inter-system handover from the source base station to the target base station is completed, the terminal may further send a handover complete message to the target base station eNB to denote that the inter-system handover of the terminal is completed.

In step S318, the terminal measures the beam in the cell on the gNB side according to the measurement configuration information.

After the terminal switches from the gNB to the eNB, the beam in the cell on the gNB side may be measured according to the measurement configuration information configured by the source base station gNB. Specifically, the terminal measures each beam in the cell according to the beam measurement indication in the measurement configuration information. For example, in the present embodiment, the terminal measures each beam in the cell on the gNB side to acquire the beam measurement result according to information 1)-4) in the IRAT measurement configuration. During a time period t1-t2 instructed by the IRAT measurement configuration, the terminal measures the beam according to a frequency point list, a measurement bandwidth of a carrier frequency, and the measurement configuration information of the SSB in the IRAT measurement configuration.

In step S320, the terminal derives a cell measurement result according to the measurement configuration information and the beam measurement result.

One cell in the gNB may include a plurality of beams, and after the terminal measures the plurality of beams, a measurement result of each beam may be acquired. Assuming that there are seven beams b1, b2, . . . b7 in a certain cell, the terminal may derive the cell measurement result based on the beam measurement results of the seven beams and a cell measurement strategy in the measurement configuration information.

Figure 4:
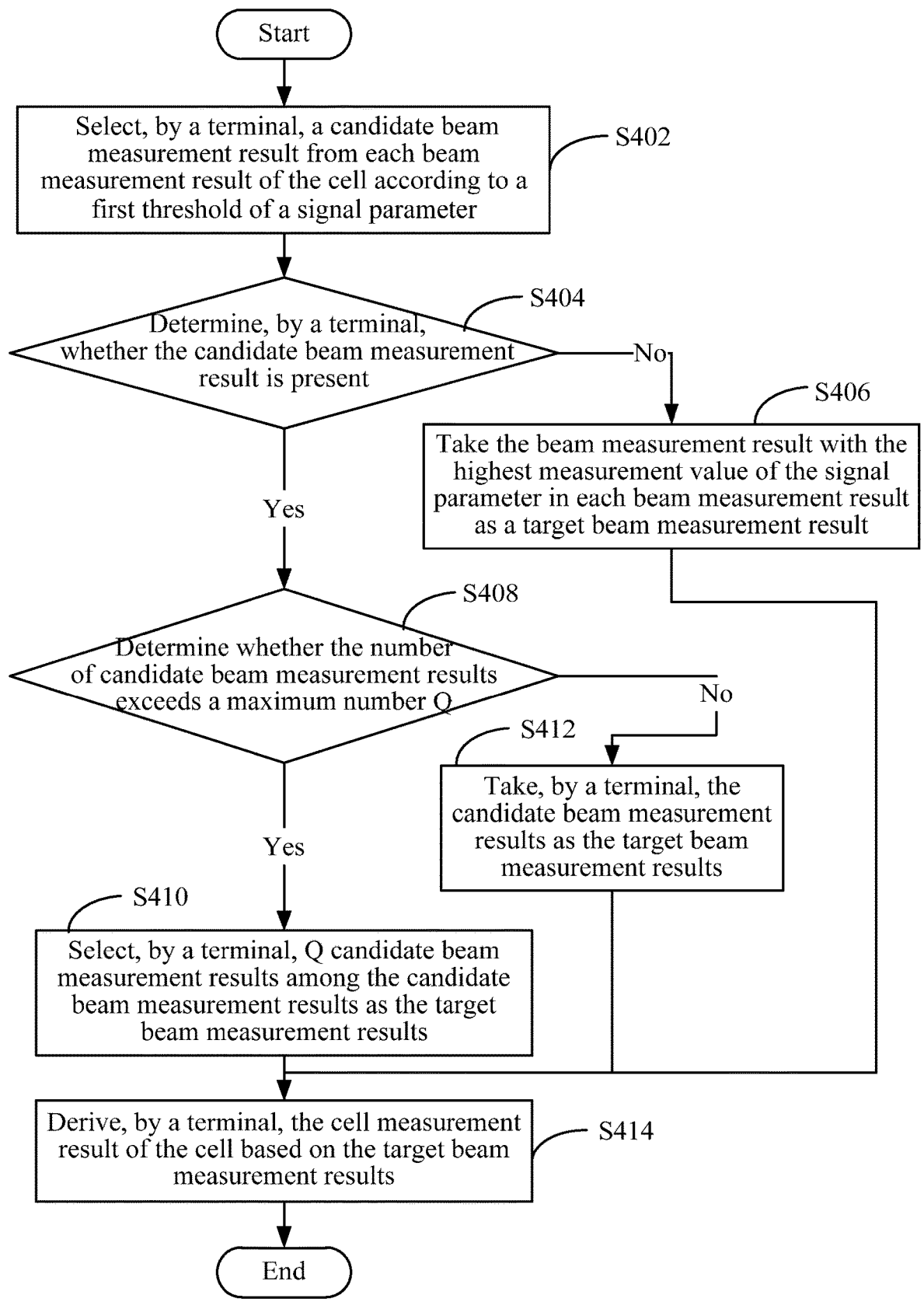
FIG. 4 is a flowchart of a terminal to derive, based on a beam measurement result, a cell measurement result according to embodiment two of the present disclosure.

In the present embodiment, the terminal does not necessarily perform calculation according to the beam measurement results of all beams in the cell when calculating the cell measurement result, but instead selects "high-quality beams" from each beam measurement result to participate in the calculation according to an indication in the cell measurement strategy. With reference to FIG. 4, the following describes the procedure in which the terminal determines the cell measurement result according to the beam measurement result of each beam in the cell.

In the previous introduction, the IRAT measurement configuration includes a first threshold of a signal parameter and the maximum number Q of beams selected by the terminal when deriving the cell measurement result, therefore, the terminal performs steps described below.

In step S402, the terminal selects candidate beam measurement results among beam measurement results of the cell according to the first threshold of the signal parameter.

The terminal selects, from the beam measurement results of each cell, the measurement value of the signal parameter greater than or equal to the first threshold corresponding to the measurement value of the signal parameter as the candidate beam measurement results. The signal parameter may be at least one of the RSRP, the RSRQ or the SINR.

In step S404, the terminal determines whether there are candidate beam measurement results.

If a determination result is yes, step S408 is performed, otherwise, step S406 is performed. If the measurement value of the signal parameter in the beam measurement results of all beams in the cell is less than the corresponding first threshold, the terminal cannot select the candidate beam measurement results, and the number of candidate beam measurement results is 0.

In step S406, the beam measurement result with the highest measurement value of the signal parameter in each beam measurement result is taken as a target beam measurement result.

Since the terminal fails to select the beam measurement result whose measurement value of the signal parameter is higher than the corresponding first threshold, in the present embodiment, the terminal selects a beam measurement result with an optimal measurement value as the basis for deriving the cell measurement result as the target beam measurement result.

In step S408, the terminal determines whether the number of candidate beam measurement results exceeds the maximum number Q.

In the present embodiment, the number of beam measurement results participating in the calculation is less than or equal to Q when calculating and determining the cell measurement result. After the terminal selects the candidate beam measurement results according to the first threshold of the signal parameter, the terminal will further determine whether the number of candidate beam measurement results exceeds the maximum number Q. If a determination result of the terminal is yes, step S410 is performed, otherwise, step S412 is performed.

In step S410, the terminal selects Q candidate beam measurement results from the candidate beam measurement results as the target beam measurement results.

If the terminal determines that the number of candidate beam measurement results is greater than Q, this means that in the cell of the gNB, there are more than Q beam measurement results whose the measurement value of the signal parameter exceeds the corresponding first threshold. In this case, the terminal may select Q beam measurement results from the candidate beam measurement results as the target beam measurement results that finally participate in the calculation of the cell measurement result. When a selection is performed, the terminal may randomly select from the candidate beam measurement results, or may select the better measurement result from the candidate beam measurement results in the order of the measurement value of the signal parameter from high to low as the target beam measurement result. Of course, those skilled in the art will appreciate that when the number of candidate beam measurement results is greater than Q, the terminal selects Q candidate beam measurement results from the candidate beam measurement results as the target beam measurement results, which is only one example of the present embodiment, and in other examples of the terminal, the number of target beam measurement results selected by the terminal may be less than Q.

In step S412, the terminal directly takes the candidate beam measurement results as the target beam measurement results.

Since the terminal determines that the number of current candidate beam measurement results of the cell does not exceed Q after judgment, the terminal does not require to screen the candidate beam measurement results again, and may directly take the candidate beam measurement results as the target beam measurement results, thus allowing the candidate beam measurement results to participate in the calculation of the cell measurement result.

In step S414, the terminal derives the cell measurement result of the cell based on the target beam measurement results.

After the target beam measurement results of the cell are determined by S406, S410 or S412, the terminal may perform a mean value calculation according to the measurement values according to each target beam measurement result, thereby acquiring the cell measurement result.

Figure 5:
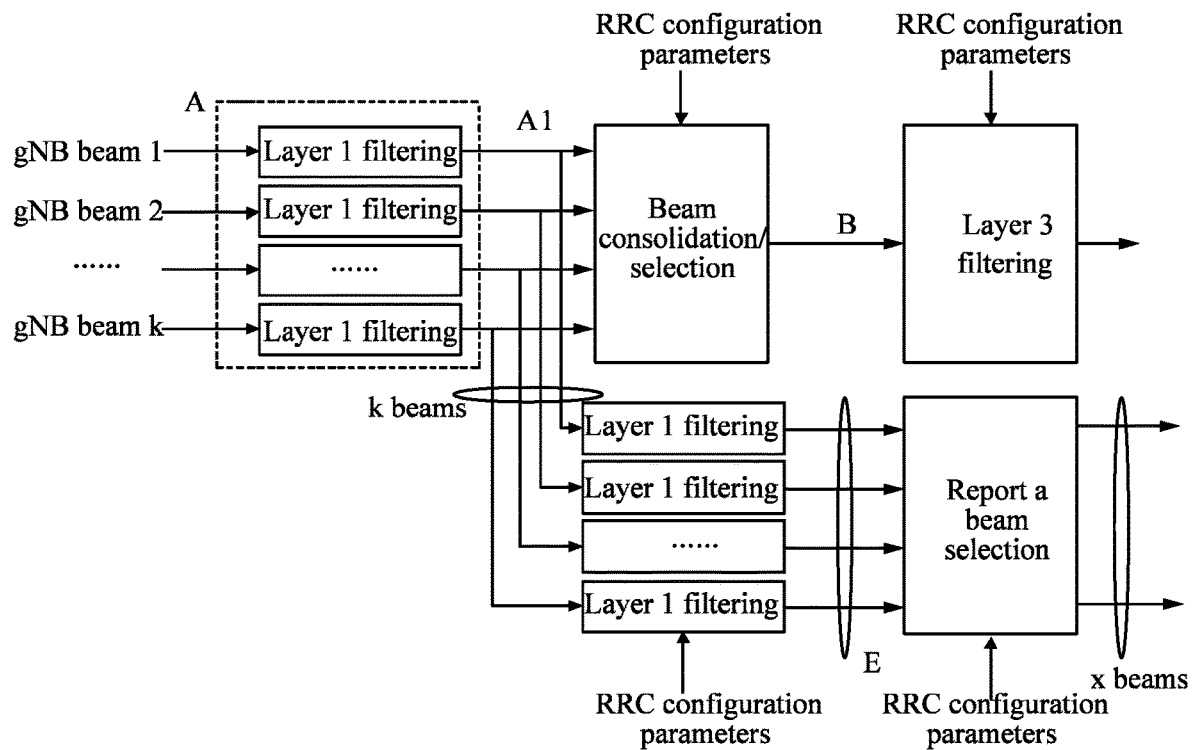
FIG. 5 is a model diagram of a terminal to measure a cell on a source base station according to embodiment two of the present disclosure.

FIG. 5 shows a schematic diagram of a model for a terminal to measure a cell in the gNB. In A to A1, the terminal performs a layer 1 filtering processing on k beams (gNB beam1, gNB beam2 . . . gNB beam k) of the cell according to RRC configuration parameters to acquire respective beam measurement results of the k beams. Between A1 and B, the terminal performs a beam consolidation/selection processing on the beam measurement results of the k beams, that is, the target beam measurement results are selected according to the first threshold of the signal parameter and the maximum number Q of the target beam measurement results. In the B, the terminal may calculate the cell measurement result according to the selected target beam measurement results. After the B, the terminal performs a layer 3 filtering processing on the cell measurement result, and then sends the cell measurement result after the layer 3 filtering processing to the target base station eNB.

In S322, the terminal sends the cell measurement result to the eNB.

After the terminal acquires the cell measurement result through calculation, the cell measurement result is sent to the eNB, so that the eNB determines the necessity of the inter-system handover of the terminal according to the cell measurement result.

From the preceding description of the IRAT measurement configuration, in some examples of the present embodiment, the IRAT measurement configuration may include an indication of whether to report the beam and the maximum number of to-be-reported beams, so that if the source base station gNB sends the IRAT measurement configuration to the target base station eNB, and the IRAT measurement configuration instructs that the beam is to be reported and specifies the number x of to-be-reported beams, the terminal further requires to select x beam measurement results with better measurement value from the beam measurement results of the cell, and send the x beam measurement results and beam information (SSB index) corresponding to the x beam measurement results to the target base station eNB together with the cell measurement result.

In FIG. 5, branches of A1 to E show the principle of beam reported by the terminal. Between A1 to E, the terminal performs the layer 3 filtering processing on the k beam measurement results in the cell on the gNB, selects the beam selection results that need to perform to-be-reported beam from k beam selection results according to relevant beam report indication information sent by the source base station side and then sends the beams to the target base station eNB.

In step S324, the eNB determines the necessity of this inter-system handover of the terminal according to necessity evaluation information.

After the eNB receives the cell measurement result sent by the terminal, whether the inter-system handover of the terminal is necessary is determined according to the necessity evaluation information in the IRAT measurement configuration. In the present embodiment, the necessity evaluation information in the IRAT measurement configuration is a second threshold of the signal parameter. When the terminal determines whether one cell satisfies service requirements of the terminal, it is ensured that the measurement value of each signal parameter in the cell measurement results exceeds the corresponding second threshold. Once the measurement value of a certain signal parameter in the cell measurement result does not satisfy requirement of the corresponding second threshold, the eNB will determine that the cell corresponding to the cell measurement result does not satisfy the service requirements of the terminal. When it is determined that the inter-system handover of the terminal is necessary, the eNB determines that the inter-system handover of the terminal is the unnecessary handover as long as the corresponding cell indicated by the cell measurement result of at least one cell on the source base station gNB side satisfies the service requirements of the terminal. Only when each cell on the gNB side does not satisfy the service requirements of the terminal, the eNB determines that the inter-system handover of the terminal is the necessary handover.

Since the possible signal parameters in the necessity evaluation information include at least one of the RSRP, the RSRQ, or the SINR, the determination procedure of handover necessity performed on the target base station will be briefly described below.

If the IRAT measurement configuration only includes a second threshold of the RSRP, then the measurement value of the RSRP in the cell measurement result of at least one cell exceeds the second threshold of the RSRP in the measurement duration, so that the target side eNB determines that the inter-system handover of the terminal from the gNB to the base station side is unnecessary.

If the IRAT measurement configuration only includes a second threshold of the RSRQ, the measurement value of the RSRQ in the cell measurement result of at least one cell exceeds the second threshold of the RSRQ in the measurement duration, so that the target side eNB determines that the inter-system handover of the terminal from the gNB to the base station side is unnecessary.

If the IRAT measurement configuration only includes a second threshold of the SINR, then the eNB determines that the measurement value of the SINR in the cell measurement result of at least one cell exceeds the second threshold of the SINR in the measurement duration, so that the target side eNB determines that the inter-system handover of the terminal from the gNB to the base station side is unnecessary.

If the IRAT measurement configuration includes the second threshold of the RSRP and the second threshold of the RSRQ, then the eNB determines that the measurement value of the RSRP in the cell measurement result of at least one cell exceeds the second threshold of the RSRP in the measurement duration and the measurement value of the RSRQ exceeds the second threshold of the RSRQ, so that the target side eNB determines that the inter-system handover of the terminal from the gNB to the base station side is unnecessary.

If the IRAT measurement configuration includes the second threshold of the RSRP and the second threshold of the SINR, then the eNB determines that the measurement value of the RSRP in the cell measurement result of at least one cell exceeds the second threshold of the RSRP in the measurement duration and the measurement value of the SINR exceeds the second threshold of the SINR, so that the target side eNB determines that the inter-system handover of the terminal from the gNB to the base station side is unnecessary.

If the IRAT measurement configuration includes the second threshold of the RSRQ and the second threshold of the SINR, then the eNB determines that the measurement value of the RSRQ in the cell measurement result of at least one cell exceeds the second threshold of the RSRQ in the measurement duration and the measurement value of the SINR exceeds the second threshold of the SINR, so that the target side eNB determines that the inter-system handover of the terminal from the gNB to the base station side is unnecessary.

If the IRAT measurement configuration includes the second threshold of the RSRP, the second threshold of the RSRQ and the second threshold of the SINR, then it is required that the measurement value of the RSRP in the cell measurement result of at least one cell exceeds the second threshold of the RSRP, the threshold of the RSRQ and the threshold of the SINR, and the measurement value of the SINR exceed the second threshold of the SINR, so that the target side eNB determines that the inter-system handover of the terminal from the gNB to the base station side is unnecessary.

In step S326, the eNB sends a system handover report to the gNB through the MME network element and the AMF network element in turn.

In the present embodiment, regardless of whether the eNB determines that the inter-system handover of the terminal is necessary or unnecessary, the system handover report is sent to the gNB through the MME network element and the AMF network element in turn. However, when the inter-system handover of the terminal is the necessary handover, the system handover report cannot indicate that the handover of the terminal is the unnecessary handover, and when the inter-system handover of the terminal is the necessary handover, the system handover report sent by the eNB to the gNB can indicate that the handover of the terminal is the unnecessary handover.

It has been introduced in embodiment one that the system handover report may include a handover type, a handover issue, a serving cell identification (NR-CGI) of the source base station side, and a serving cell identification (ECGI) of the target base station side. In a situation of the present embodiment, the handover type refers to a "handover from the NG-RAN to the EUTRAN". In addition, the system handover report further includes a cell list, and the cell list includes a cell measurement result and a corresponding cell identification of the source base station gNB side, where the cell measurement result satisfies each requirement of the necessity evaluation information. At the same time, the cell list may further include beam information reported by the terminal to the eNB and corresponding beam measurement results.

After the source base station gNB receives the system handover report, if it is determined that the handover for indicating the terminal in the system handover report is the unnecessary handover, it may be further determined whether it is necessary to adjust the handover threshold of the signal parameter that triggers the terminal to perform the inter-system handover, so as to avoid the recurrence of the unnecessary handover. In this way, the source base station may adjust/set an appropriate handover threshold of the signal parameter, so that the terminal can reside in an NR system as much as possible, and the NR system can provide communication services superior to a EUTRA system for users on the terminal side and improve the user experience.

Embodiment Three

Figure 6:
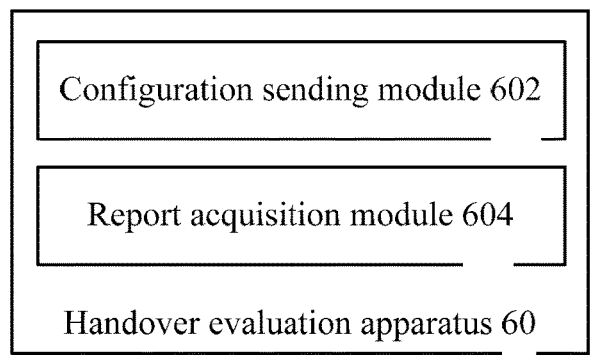
FIG. 6 is a structural diagram of a handover evaluation apparatus according to embodiment three of the present disclosure.

The present embodiment first provides a handover evaluation apparatus, which is used for achieving a handover evaluation procedure in a handover evaluation scheme in the above-mentioned embodiment. Please refer to a structural diagram of a handover evaluation apparatus 60 shown in FIG. 6.

The handover evaluation apparatus 60 includes a configuration sending module 602 and a report acquisition module 604. The configuration sending module 602 is configured to send measurement configuration information and necessity evaluation information to a target base station. The report acquisition module 604 is configured to acquire a system handover report that is generated by the target base station according to a cell measurement result and the necessity evaluation information.

In the present embodiment, the handover evaluation apparatus 60 may be deployed on a source base station, and the source base station may be a base station in various communication systems, such as a gNB base station in a 5G communication system or an eNB base station in an LTE system, or a base station in a 3G communication system or a base station in a 2G communication system, or even a base station in various future communication systems. Functions of the configuration sending module 602 and the report acquisition module 604 may be executed by a processor of the source base station controlling to communication apparatus of the base station.

The source base station refers to a base station that provides a service for the terminal before the terminal performs the inter-system handover, and the target base station is naturally a base station that provides the service for the terminal after the terminal completes the inter-system handover. The inter-system handover, as the name suggests, refers to the terminal switching from a base station of a communication system to a base station of the other communication system. Certainly, the inter-system handover may be switched from a base station using a relatively old communication technology (hereinafter referred to as "old base station") to a base station using a relatively new communication technology (hereinafter referred to as "new base station"), for example, from an eNB base station in a 4G communication system to a gNB base station in a 5G communication system; or may be switched from the new base station to the old base station. For example, the terminal switches from the gNB base station to the eNB base station or the base station in the 2G or 3G communication system. It is understood that if the current coverage situation of the new base station satisfies a service requirement of the terminal, the terminal should be allowed to reside under the new base station as far as possible, and the new base station should provide a communication service for the terminal, which is beneficial to improving the communication experience of the terminal side users. In the present embodiment, the situation that the handover evaluation apparatus needs to understand the necessity of the inter-system handover of the terminal refers to a handover of the terminal from the new base station to the old base station. For the inter-system handover of the terminal from the old base station to the new base station, the handover evaluation apparatus 60 may not have to care about the necessity of the inter-system handover of the terminal from the old base station to the new base station, because it is beneficial to improve the experience of the terminal side users.

The measurement configuration information is used for instructing the terminal to measure a cell on a source base station side and report a cell measurement result. The measurement configuration information includes at least information for instructing a measurement target to the terminal and how the terminal measures measurement strategy information. After the target base station acquires the measurement configuration information, the terminal may be instructed to measure the cell on the source base station side according to an indication in the measurement configuration information.

The necessity evaluation information is used for the target base station to determine the cell measurement result reported by the terminal, so as to determine whether the terminal to perform the inter-system handover from the source base station to the target base station is necessary. It is understood that the necessity evaluation information may include indexes of at least one signal parameter that determine whether the inter-system handover of the terminal is necessary, for example, these indexes may be a second threshold of the signal parameter. The signal parameter may include, but is not limited to, at least one of RSRP, RSRQ, or SINR. For example, when the signal parameter includes the RSRP and the SINR at the same time, the necessity evaluation information may include a second threshold of the RSRP and a second threshold of the SINR at the same time.

In the present embodiment, a communication mode between the configuration sending module 602 and the target base station is not specifically limited, and any mode or approach in which the configuration sending module 602 may send the measurement configuration information and the necessity evaluation information to the target base station is feasible.

It is understood that a handover evaluation system may include not only the aforementioned source base station, target base station and terminal, and further includes other network devices. For example, in one example of the present embodiment, the handover evaluation system further includes a source core network device and a target core network device, where the source core network device is a core network device in a communication system of the source base station side, and the target core network device is a core network device in a communication system of the target base station side. For example, if the source base station is the gNB and the target base station is the eNB, the source core network may be a 5G core network and the target core network may be a 4G core network.

In some examples of the present embodiment, as shown in FIG. 2, FIG. 2 shows a schematic diagram of a handover evaluation system 2. The handover evaluation system 2 includes a source base station 21, a target base station 24, a terminal 25, a source core network device and a target core network device, where the source base station 21 is the gNB and the target base station 24 is the eNB, correspondingly, the core network device is an AMF network element 22, and the target core network device is an MME network element 23. The source base station 21 may communicate with the AMF network element 22 through an NG interface, the target base station 24 may communicate with the MME network element 23 through an S1 interface, and the AMF network element 22 may interact with the MME network element 23 through an N26 interface. In this example, when the handover evaluation apparatus 60 is deployed on the source base station 21, the configuration sending module 602 may first send the measurement configuration information and the necessity assessment information to the AMF network element 22 through the NG interface, then the AMF network element 22 sends the measurement configuration information and the necessity evaluation information to the MME network element 23 through the N26 interface, and then the MME network element 23 may send the measurement configuration information and the necessity evaluation information to the target base station 24 through the S1 interface.

In the present embodiment, after the report acquisition module 604 receives the system handover report sent by the target base station, the necessity of the terminal to switch to the target base station is determined. Further, in some examples of the present embodiment, the handover evaluation apparatus 60 may further include a threshold setting module (not shown in FIG. 6). When the handover evaluation apparatus 60 determines that the system handover report indicates that the handover of the terminal is the unnecessary handover, it may be determined that a handover threshold of the signal parameter of the source base station side may be set unreasonably. Certainly, if inter-system handover of only one terminal is the unnecessary handover, the unnecessary handover may be caused due to accidental factors, however, if the report acquisition module 604 receives multiple system handover reports, and the multiple system handover reports indicate that the handover of the corresponding terminal is the unnecessary handover, so in this case, it can be determined that the handover threshold of the signal parameter set by the source base station is unreasonable, therefore, the threshold setting module can adjusted the handover threshold of the signal parameter according to the system handover reports.

Figure 7:
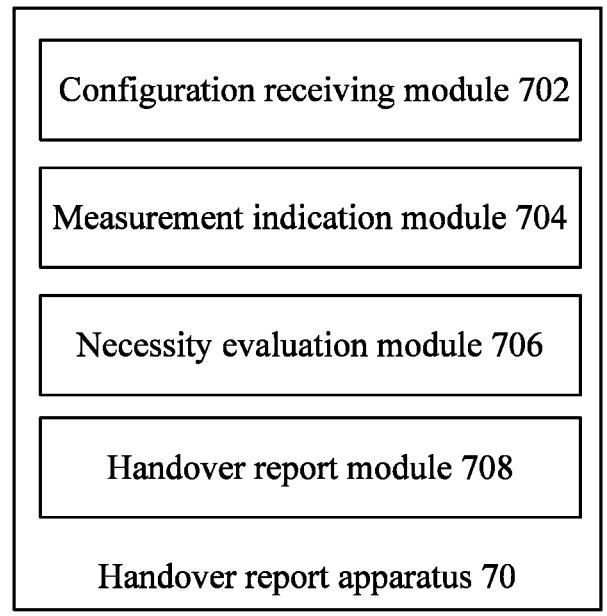
FIG. 7 is a structural diagram of a handover report apparatus according to embodiment three of the present disclosure.

A handover report apparatus is introduced as below. The handover report apparatus is used for achieving a handover report procedure in a handover evaluation scheme in the above-mentioned embodiment. A structural diagram of a handover report apparatus is shown in FIG. 7.

A handover report apparatus 70 includes a configuration receiving module 702, a measurement indication module 704, a necessity evaluation module 706 and a handover report module 708. The configuration receiving module 702 is configured to receive measurement configuration information and necessity evaluation information sent by a source base station; the measurement indication module 704 is configured to send the measurement configuration information to a terminal; the necessity evaluation module 706 is configured to determine whether inter-system handover of the terminal from the source base station to a target base station is necessary according to the necessity evaluation information and a cell measurement result reported by the terminal; and the handover report module 708 is configured to generate a system handover report when the inter-system handover is determined as an unnecessary handover and send the system handover report to the source base station.

In the present embodiment, the handover report apparatus 70 may be deployed on the target base station, and the target base station may be a base station in various communication systems, such as a gNB base station in a 5G communication system or an eNB base station in an LTE system, or a base station in a 3G communication system or a base station in a 2G communication system, or even a base station in various future communication systems. Functions of the configuration receiving module 702, the measurement indication module 704 and the handover report module 708 may be executed by a processor of the source base station controlling a communication apparatus of the base station. Functions of the necessity evaluation module 706 may be executed by a processor of the target base station.

After the configuration receiving module 702 receives the measurement configuration information and the necessity evaluation information sent by the source base station, the measurement indication module 704 may instruct the terminal to measure a cell on the source base station side according to the measurement configuration information. For example, in the present embodiment, the measurement indication module 704 may send the measurement configuration information received by the configuration receiving module 702 to the terminal.

In some examples of the present embodiment, when the terminal needs to perform the inter-system handover from the source base station to the target base station, the source base station sends the measurement configuration information and the necessity evaluation information carried in a transparent container message from the source base station to the target base station to the configuration receiving module 702 of the handover report apparatus 70, therefore, after the configuration receiving module 702 acquires the measurement configuration information and the necessity evaluation information through the transparent container message from the source base station to the target base station, the handover report apparatus 70 further needs to give feedback to the source base station side, and the source base station instructs the terminal that is about to perform the inter-system handover but has not yet completed the handover to switch to the target base station.

After the terminal completes the measurement for the source base station side cell according to the measurement configuration information, the necessity evaluation module 706 may determine whether inter-system handover of the terminal from the source base station to the base station is necessary according to the necessity evaluation information and the cell measurement result reported by the terminal.

According to the previous introduction, the necessity evaluation information may be used for the necessity evaluation module 706 to evaluate the cell measurement result fed back by the terminal. The necessity evaluation information includes a second threshold of a signal parameter, and the necessity evaluation module 706 may determine whether a measurement value of the signal parameter of a corresponding side in the cell measurement result exceeds the second threshold of the signal parameter. Assuming that the necessity evaluation information includes a second threshold of the signal parameter A and a second threshold of the signal parameter B, the necessity evaluation module 706 needs to evaluate whether the measurement value of the signal parameter A in the cell measurement result exceeds the second threshold of the signal parameter A, and whether the measurement value of the signal parameter B in the cell measurement result exceeds the second threshold of the signal parameter B in the necessity evaluation information.

It is understood that since the necessity evaluation information is from the source base station side, the second threshold of the signal parameter is set by the source base station. When the second threshold of the signal parameter is set, the source base station needs to consider the lowest value of the signal parameter that may provide services to the terminal. For example, assuming that the signal parameter is the RSRP, when the source base station needs to consider the services provided by the base station to the terminal, what is the lowest value of the RSRP of the terminal? When the second threshold of the RSRP is set, the second threshold cannot be lower than the lowest value of the RSRP. Otherwise, when a measurement value of the RSRP of the cell is higher than the second threshold of the RSRP in the cell measurement result reported by the terminal, the necessity evaluation module 706 still cannot determine whether the RSRP of the current cell satisfies the requirements for providing the services. In the present embodiment, the second threshold of one signal parameter is usually slightly higher than the lowest value of the signal parameter when providing the services to the terminal.

For each cell, if the measurement value of each signal parameter in the cell measurement result satisfies a corresponding requirement in the measurement evaluation information, it means that the cell can actually provide a signal coverage satisfying the service requirement of the terminal to the terminal at least during the time period when the terminal performs measurement. In some examples of the present embodiment, if the necessity evaluation module 706 determines that the measurement results of at least N cells among the M cell measurement results reported by the terminal all indicate that the service requirements of the terminal may be satisfied, the necessity evaluation module 706 determines that the inter-system handover of the terminal from the source base station to the target base station side is unnecessary and belongs to the unnecessary handover. If the number of cell measurement results among M cell measurement results that satisfy the requirements of the necessity evaluation information is less than N, the necessity evaluation module 706 may determine that the inter-system handover of the terminal from the source base station to the target base station side belongs to the necessary handover. N is less than or equal to M. In an example of the present embodiment, N is equal to 1. Therefore, as long as the necessity evaluation module 706 determines that the measurement value of each signal parameter in at least one cell measurement result in each cell measurement result reported by the terminal satisfies the corresponding requirement in the necessity evaluation information, the necessity evaluation module 706 determines that the inter-system handover of the terminal belongs to the unnecessary handover, because if the terminal continues to reside on the source base station side, a cell corresponding to the cell measurement result at least can satisfy the service requirements of the terminal. If the target base station determines that more or less measurement values of some signal parameters in each cell measurement result reported by the terminal do not satisfy the corresponding the requirement in the necessity evaluation information, the necessity evaluation module 706 determines that the inter-system handover of the terminal belongs to the necessary handover, because during this measurement duration of the terminal, no cell on the source base station side can satisfy the service requirement of the terminal, therefore, if the terminal continues to reside on the source base station, the source base station cannot provide the requirement satisfactory to the user to the terminal.

After the necessity evaluation module 706 determines the necessity of the inter-system handover of the terminal according to the necessity evaluation information and the cell measurement result reported by the terminal, if handover report module 708 determines that the inter-system handover of the terminal is the unnecessary handover, a system handover report is generated and sent to the source base station, so that the source base station knows that the unnecessary system handover currently has occurred at the terminal according to the system handover report, and then whether a handover threshold of the signal parameter set by the source base station is appropriate can be evaluated based on the received system handover report. It is understood that since the system handover report is generated and sent to the source base station when the handover report module 708 determines that the unnecessary handover has occurred at the terminal, the system handover report should include information capable of instructing that the handover of the terminal is the unnecessary handover.

In some examples of the present embodiment, regardless of whether the handover of the terminal is necessary, the handover report module 708 may generate the system handover report and send the system handover report to the source base station. However, it is understood that handover reports generated for two situations of the unnecessary handover and the necessary handover occurred at the terminal are different, at least the system handover generated by the handover report module 708 when the necessary inter-system handover has occurred at the terminal cannot indicate that the inter-system handover of the terminal is unnecessary. In one example of the present embodiment, the system handover report generated by the handover report module 708 may indicate the necessity of the inter-system handover of the terminal through a "handover issue". If the inter-system handover of the terminal from the source base station to the target base station is the unnecessary handover, information carried in the handover issue may be information that may indicate the handover as an "unnecessary inter-system handover", otherwise, the information carried in the handover issue may be other information. For example, assuming that the information carried in the handover issue may be "0", "1", and "2", where "0" indicates that the handover issue is the unnecessary system handover, "1" indicates that the handover of the terminal is due to a first issue, and "2" indicates that the handover of the terminal is due to a second issue, then after the necessity evaluation module 706 determines that the inter-system handover of the terminal is the unnecessary handover, the value carried in the handover issue in the system handover report generated by the handover report module 708 should be "0".

In other examples of the present embodiment, the system handover report includes, in addition to information indicating the necessity of the inter-system handover of the terminal, such as the handover issue, and may further include at least one of the following.

1) A handover type of the inter-system handover of the terminal.

2) A serving cell identification of the source base station side, where a serving cell on the source base station side is a cell that resides on the source base station side before the terminal leaves the source base station and switches to the target base station side.

3) A serving cell identification of the target base station side, where the serving cell of the target base station side refers to a cell that the target base station side provides the services for the terminal after the terminal achieves the inter-system handover.

4) A cell measurement result and corresponding cell identification of the source base station side, where cell measurement result satisfies each requirement of the necessity evaluation information. If the target base station determines that the measurement value of each signal parameter in the cell measurement results of K cells on the source base station side is greater than the second threshold of the corresponding signal parameter in the necessity evaluation information, the target base station can send the cell identifications of the K cells and the cell measurement results of the K cells carried in the system handover report to the source base station.

5) Beam information and a beam measurement result corresponding to the beam information. If the measurement configuration information configured by the source base station includes "an indication of whether to report information of a beam and a beam measurement result corresponding to the beam", and the indication instructs that the terminal needs to report the information of the beam and a beam measurement result corresponding to the beam, the system handover report further includes the information of the beam reported by the terminal and the corresponding beam measurement result. If the measurement configuration information further instructs the number for indicating both the maximum number of pieces of to-be-reported information of beams and the maximum number of beam measurement results corresponding to the beams, the number of pieces of information of the beams and the beam measurement results carried in the system handover report satisfies the requirement of the maximum number.

According to the foregoing introduction, in some handover evaluation systems, the target base station may communicate with the source base station through the target core network device and the source core network device, so in one example of the present embodiment, the handover report module 708 may first send the system handover report to the target core network device, and then the target core network device may send the system handover report to the source base station through the source core network device. With reference to the handover evaluation system 2 shown in FIG. 2, when the handover report apparatus 70 is set on the target base station, the handover report module 708 through the target base station 24 may first send the system handover report to the MME network element 23 through the S1 interface, and then the MME network element 23 sends the system handover report to the AMF network element 22 through the N26 interface. After receiving the system handover report from the target base station 24, the AMF network element 22 will send the system handover report to the source base station 21 through the NG interface. It is understood that the communication mode between the handover report module 708 and the source base station is not limited to the one introduced in this example.

Figure 8:
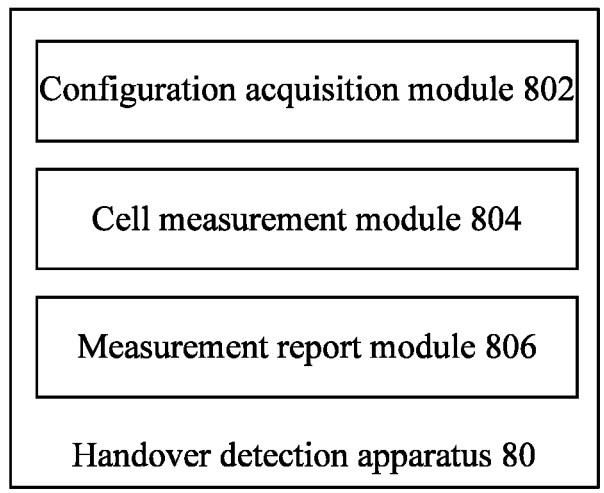
FIG. 8 is a structural diagram of a handover detection apparatus according to embodiment three of the present disclosure.

In addition, the present embodiment further provides a handover detection apparatus, which is used for achieving a handover evaluation procedure in a handover evaluation scheme in the above-mentioned embodiment. Please refer to a structural diagram of a handover detection apparatus 80 shown in FIG. 8.

The handover detection apparatus 80 includes a configuration acquisition module 802, a cell measurement module 804 and a measurement report module 806. The configuration acquisition module 802 is configured to receive measurement configuration information from a source base station sent by a target base station; the cell measurement module 804 is configured to measure a cell on a source base station side according to the measurement configuration information; and the measurement report module 806 is configured to report a cell measurement result to the target base station.

The handover detection apparatus 80 in the present embodiment may be deployed on the terminal, and the terminal may be a terminal supporting any current communication system or a terminal supporting a future communication system. Functions of the configuration acquisition module 802, the cell measurement module 804 and the measurement report module 806 may be executed by a processor of the terminal controlling a communication unit.

After the configuration acquisition module 802 of the handover detection apparatus 80 acquires the measurement configuration information from the target base station, the cell measurement module 804 may measure the cell on the source base station side according to measurement configuration information, and then the measurement report module 806 feeds back a measurement result to the target base station based on the cell, i.e. sends a cell measurement result to the target base station.

In some examples of the present embodiment, since the source base station is the gNB, the measurement of the cell on the source base station side performed by the cell measurement module 804 is actually based on the measurement of the beam in the cell. In the measurement configuration information, the source base station is configured with a beam measurement indication and a cell measurement strategy, and the beam measurement indication enables the cell measurement module 804 to measure each beam in the cell on the source base station side in units of beams. It is understood that the source base station includes at least one cell, and the source base station configures at least one beam for each cell. The cell measurement module 804 may acquire a measurement result of each beam in the cell according to the beam measurement indication, and in order to acquire the cell measurement result, the cell measurement module 804 may determine the measurement result of the cell based on the measurement result of each beam according to the cell measurement strategy in the measurement configuration information.

Assuming that the target base station is the eNB, considering that the measurement of the NR system performed by the cell measurement module 804 in the LTE system only supports a measurement of a SSB, therefore, in some examples of the present embodiment, a physical layer acquires the measurement results of a plurality of beams in the cell by measuring the SSB. In this example, the beam measurement indication may include measurement configuration information of the SSB of the source base station side. In addition to the measurement configuration information of the SSB of the source base station side, the beam measurement indication further includes measurement duration configured by the source base station, a measurement target bandwidth configured by the source base station, and a measurement frequency point list configured by the source base station. The measurement duration is used for instructing the cell measurement module 804 to measure the cell on the source base station side in which time period. The measurement target bandwidth and the measurement frequency point list are mainly used for the cell measurement module 804 to determine a measurement target.

In some examples of the present embodiment, the cell measurement strategy may instruct the cell measurement module 804 to derive the measurement result of the cell based on the measurement result of each beam in the cell. In more examples, the cell measurement strategy only may instruct the cell measurement module 804 to select a part from the measurement result of each beam in the cell as basic of deriving the cell measurement result. The cell measurement strategy will instruct how the cell measurement module 804 selects and how many beam measurement results are selected. In this scheme, after each beam measurement result participating in the determination the cell measurement result is selected according to the cell measurement strategy, the cell measurement module 804 calculates according to the selected beam measurement result to acquire the cell measurement result, for example, the cell measurement module 804 calculates the average value of the selected beam measurement results to acquire the cell measurement result.

After the cell measurement module 804 acquires the cell measurement result of each cell in the source base station, the measurement report module 806 sends the cell measurement result to the target base station, so that the target base station determines whether the handover of the terminal from the source base station to the target base station is necessary.

A handover evaluation apparatus, a handover report apparatus and a handover detection apparatus provided in the embodiment cooperate with each other, after the terminal switches from the source base station to the target base station, the source base station can know whether this inter-system handover of the terminal is the necessary handover, and then reflect on whether the handover threshold of the signal parameter on the source base station side that can cause the terminal to carry out the inter-system handover is set reasonably. In order to avoid the problem in the related art that the source base station does not know that the terminal always performs the unnecessary handover due to unreasonable setting the handover threshold of the signal parameter on the source base station side, therefore, the handover evaluation scheme in the embodiment is actually a feedback mode for the source base station. When the handover threshold of the signal parameter is set/adjusted, the source base station may consider the feedback of the handover threshold of the current signal parameter on the terminal side, thus setting a more reasonable handover threshold, reducing the unnecessary handover on the terminal side and improving the user experience on the terminal side.

Embodiment Four

This embodiment provides a storage medium. The storage medium may store one or more computer programs that can be read, compiled and executed by one or more processors. In this embodiment, the storage medium may store at least one of a handover evaluation program, a handover report program or a handover detection program. The handover evaluation program can be used by one or more processors to execute the steps that are performed by the handover evaluation method of any one of embodiments one and two. The handover report program can be used by the one or more processors to execute the steps that are performed by the handover report method of any one of embodiments one and two. The handover detection program can be used by the one or more processors to execute the steps that are performed by the handover detection method of any one of embodiments one and two.

Figure 9:
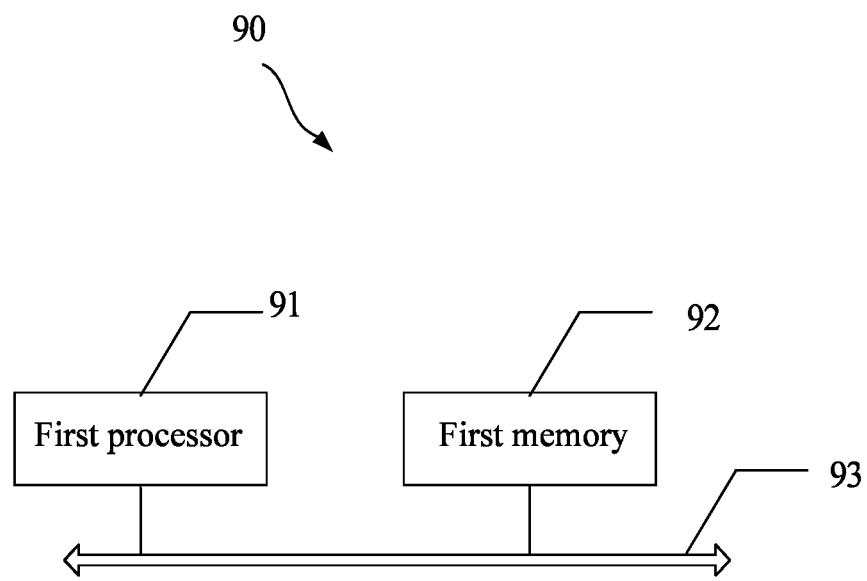
FIG. 9 is a hardware structure diagram of a base station according to embodiment four of the present disclosure.
Figure 10:
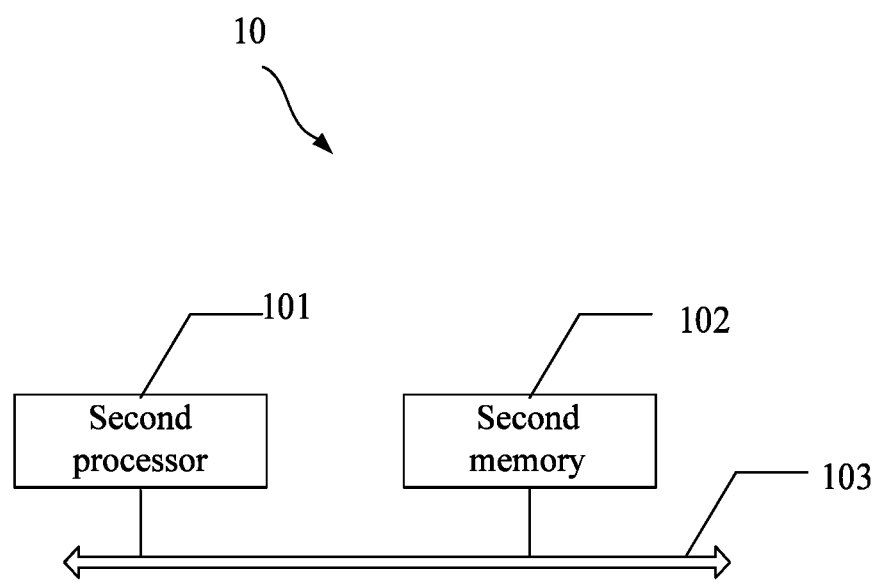
FIG. 10 is a hardware structure diagram of a terminal according to embodiment four of the present disclosure.

This embodiment further provides a base station. FIG. 9 is a hardware structure diagram of the base station.

The base station 90 includes a first processor 91, a first memory 92, and a first communication bus 93 for connecting the first processor 91 and the first memory 92. The first memory 92 may be the preceding storage medium storing a handover evaluation program. The first processor 91 may read, compile and execute the handover evaluation program stored in the first memory 92 to execute the steps that are performed by the handover evaluation method of any one of embodiments one and two. Alternatively, the first memory 92 may be the above-mentioned storage medium storing the handover report program. The first processor 91 may read, compile and execute the handover report program stored in the first memory 92 to execute the steps that are performed by the handover report method of any one of embodiments one and two.

In the present embodiment, if the handover evaluation program is stored in the first memory, the base station 90 may be an NG-RAN base station; and if the handover report program is stored in first the memory, the base station 90 may be an Evolved base station.

For details about how the base station 90 performs the handover evaluation method or the handover report method of any one of embodiments one and two, see the description of the preceding embodiments. The details are not repeated here.

The terminal 10 includes a second processor 101, a second memory 102, and a second communication bus 103 for connecting the second processor 101 and the second memory 102. The second memory 102 may be the preceding storage medium storing the handover detection program. The second processor 101 may read, compile and execute the handover detection program stored in the second memory 102 to execute the steps that are performed by the handover detection method of any one of embodiments one and two. For details about how the terminal 10 performs the handover detection method of any one of embodiments one and two, see the description of the preceding embodiments. The details are not repeated here.

According to the base station, terminal and the storage medium provided by the present embodiment, the source base station sends measurement configuration information and necessity evaluation information to the target base station, so that the target base station instructs the terminal to measure a cell on the source base station side according to the measurement configuration information, and a cell measurement result for the cell is sent to the target base station. After the target base station receives the cell measurement result sent by the terminal, whether an inter-system handover of the terminal from the source base station to the target system is necessary may be determined according to the cell measurement result and the necessity evaluation information sent by the source base station, which provides an approach to feed back the necessity of the inter-system handover of the terminal to the source base station, so that the source base station can determine the rationality of a handover threshold of a signal parameter set by the source base station side based on the feedback, which is beneficial to improving the communication effect and communication experience on the terminal side.

It is to be understood by those skilled in the art that the handover evaluation, report and detection methods and devices, base station, terminal and storage medium provided in embodiments of the present application are applicable not only to 5G communication systems, but also to any future communication system.

Apparently, it should be understood by those skilled in the art that each of the above-mentioned modules or steps in the embodiments of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a computer storage medium (such as a read-only memory (ROM)/random access memory (RAM), a magnetic disk or an optical disk) and executed by the computing apparatuses. In some circumstances, the illustrated or described steps may be executed in sequences different from those described herein, or the modules or steps are made into various integrated circuit modules separately, or multiple modules or steps therein are made into a single integrated circuit module for implementation. Therefore, the present application is not limited to any specific combination of hardware and software.

The above content is a further detailed description of the present disclosure in conjunction with the specific embodiments, and the specific implementation of the present application is not limited to the description. For those skilled in the art to which the present disclosure pertains, a number of simple deductions or substitutions may be made without departing from the concept of the present application and should fall within the scope of the present application.

What is claimed is:

1. A handover evaluation method, comprising:
    sending a beam measurement indication, a cell measurement strategy and a threshold of one of reference signal received power (RSRP), reference signal received quality (RSRQ), or signal to interference plus noise ratio (SINR) to a target base station, wherein the beam measurement indication and the cell measurement strategy are used for the target base station to instruct a terminal to measure a cell on a source base station side and report a cell measurement result, the cell measurement strategy comprises a first threshold which is used by the terminal to select candidate beam measurement results and a maximum number of beams selected by the terminal when the terminal derives the cell measurement result.

2. The handover evaluation method of claim 1, wherein the beam measurement indication comprises at least one of: measurement duration, a measurement target bandwidth, a measurement frequency point list, or measurement configuration information of a synchronization signal/physical broadcast channel block (SSB) of the source base station side.

3. The handover evaluation method of claim 1, further compromising:
    acquiring an inter-system handover report that is generated by the target base station according to the cell measurement result and the threshold of one of RSRP, the RSRQ, or the SINR, wherein the inter-system handover report indicates that an inter-system handover of the terminal from the source base station to the target base station is an unnecessary handover.

4. The handover evaluation method of claim 3, wherein after acquiring the inter-system handover report that is generated by the target base station according to the cell measurement result and the threshold of one of RSRP, the RSRQ, or the SINR, the method further comprises:
    adjusting a handover threshold to trigger inter-system handover by the terminal according to the inter-system handover report.

5. A handover report method, comprising:
    receiving a beam measurement indication, a cell measurement strategy and a threshold of one of reference signal received power (RSRP), reference signal received quality (RSRQ), or signal to interference plus noise ratio (SINR) sent by a source base station;
    sending the beam measurement indication and the cell measurement strategy to a terminal to instruct the terminal to measure a cell on a source base station side and to report a cell measurement result;
    wherein the cell measurement strategy comprises a first threshold which is used by the terminal to select candidate beam measurement results and a maximum number of beams selected by the terminal when the terminal derives the cell measurement result.

6. The handover report method of claim 5, wherein the beam measurement indication comprises at least one of: measurement duration, a measurement target bandwidth, a measurement frequency point list, or measurement configuration information of a synchronization signal/physical broadcast channel block (SSB) of the source base station side.

7. The handover evaluation method of claim 5, further comprising:
    determining whether an inter-system handover of the terminal from the source base station to a target base station is necessary according to the threshold of one of RSRP, the RSRQ, or the SINR and the cell measurement result reported by the terminal.

8. The handover evaluation method of claim 7, further comprising:
    in response to determining that the inter-system handover is an unnecessary handover, generating an inter-system handover report, and sending the inter-system handover report to the source base station.

9. The handover report method of claim 8, wherein the inter-system handover report comprises a handover type for indicating that the inter-system handover of the terminal is the unnecessary handover, and the inter-system handover report further comprises at least one of: a source cell identification, a target cell identifier, and a cell measurement result and corresponding cell identifier of the source base station side, wherein the cell measurement result satisfies each requirement of the threshold of one of RSRP, the RSRQ, or the SINR.

10. A handover evaluation apparatus, comprising:
    a configuration sending module, which is configured to send a beam measurement indication, a cell measurement strategy and a threshold of one of reference signal received power (RSRP), reference signal received quality (RSRQ), or signal to interference plus noise ratio (SINR) to a target base station, wherein the beam measurement indication and the cell measurement strategy are used for the target base station to instruct a terminal to measure a cell on a source base station side and report a cell measurement result, the cell measurement strategy comprises a first threshold which is used by the terminal to select candidate beam measurement results and a maximum number of beams selected by the terminal when the terminal derives the cell measurement result.

11. The handover evaluation apparatus of claim 10, further comprising:
a report acquisition module, which is configured to acquire an inter-system handover report that is generated by the target base station according to the cell measurement result and the threshold of one of RSRP, the RSRQ or the SINR, wherein the inter-system handover report indicates that an inter-system handover of the terminal from the source base station to the target base station is an unnecessary handover.

12. A handover report apparatus, wherein the handover report apparatus is configured to perform the handover report method of claim 5 and comprises:
a configuration receiving module, which is configured to receive a beam measurement indication, a cell measurement strategy and a threshold of one of reference signal received power (RSRP), reference signal received quality (RSRQ), or signal to interference plus noise ratio (SINR) sent by a source base station; and
a measurement indication module, which is configured to send the beam measurement indication and the cell measurement strategy to a terminal to instruct the terminal to measure a cell on a source base station side and to report a cell measurement result;
wherein the cell measurement strategy comprises a first threshold which is used by the terminal to select candidate beam measurement results and a maximum number of beams selected by the terminal when the terminal derives the cell measurement result.

13. The handover evaluation apparatus of claim 12, further comprising:
a necessity evaluation module, which is configured to determine whether an inter-system handover of the terminal from the source base station to a target base station is necessary according to the threshold of one of RSRP, the RSRQ, or the SINR and the cell measurement result reported by the terminal.

14. The handover evaluation apparatus of claim 13, further comprising:
a handover report module, which is configured to generate an inter-system handover report in a case where the inter-system handover is determined as an unnecessary handover, and send the inter-system handover report to the source base station.

15. A base station, comprising a processor, a memory and a communication bus;
wherein the communication bus is configured to implement connection communication between the processor and the memory; and
the processor is configured to execute a handover evaluation program stored in the memory to perform the handover evaluation method of claim 1.

16. The base station of claim 15, wherein the base station is an NG-RAN base station.

17. A base station, comprising a processor, a memory and a communication bus;
wherein the communication bus is configured to implement connection communication between the processor and the memory; and
the processor is configured to execute a handover report program stored in the memory to perform the handover report method of claim 5.

18. The base station of claim 17, wherein the base station is an Evolved base station.

* * * * *